United States Patent
Hirota et al.

(10) Patent No.: US 7,371,000 B2
(45) Date of Patent: May 13, 2008

(54) SURFACE LIGHT SOURCE EQUIPMENT AND APPARATUS USING THE SAME

(75) Inventors: Kazuhide Hirota, Yasu (JP); Isao Makuta, Kusatsu (JP); Masayuki Shinohara, Nagaokakyo (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/438,727

(22) Filed: May 22, 2006

(65) Prior Publication Data

US 2006/0209563 A1  Sep. 21, 2006

Related U.S. Application Data

(63) Continuation of application No. PCT/JP2004/017421, filed on Nov. 24, 2004.

(30) Foreign Application Priority Data

Nov. 25, 2003  (JP)  ............................. 2003-393566

(51) Int. Cl.
*F21V 7/04* (2006.01)
(52) U.S. Cl. ...................................... 362/621; 362/616
(58) Field of Classification Search ................. 362/621
See application file for complete search history.

(56) References Cited

U.S. PATENT DOCUMENTS 6,530,670 B2* 3/2003 Hirayama ................... 362/628

6,975,370 B2* 12/2005 Yu et al. ........................ 349/65

FOREIGN PATENT DOCUMENTS

| JP | 10-199316 | 7/1998 |
|---|---|---|
| JP | 10-255530 | 9/1998 |
| JP | 10-293202 | 11/1998 |
| JP | 11-203923 | 7/1999 |
| JP | 2000-30520 | 1/2000 |
| JP | 2001255415 A * | 9/2001 |

OTHER PUBLICATIONS

Patent Abstracts of Japan, Publication No. 10-255530, Publication Date: Sep. 25, 1998, 30 pages.

(Continued)

*Primary Examiner*—Hargobind S. Sawhney
(74) *Attorney, Agent, or Firm*—Osha Liang LLP

(57) ABSTRACT

A light emission part in the form of a point light source composed of LED, etc., and a light conductive plate, and the light emission part is arranged in opposition to a light incident surface of the light conductive plate. First diffusion patterns and second diffusion patterns are provided alternately on the light incident surface. The first diffusion patterns comprise a V-groove provided on an inner surface of a rectangular-shaped recess provided concavely on the light incident surface. The second diffusion patterns comprise a V-groove provided on the light incident surface. When a virtual line segment in parallel to a line segment drawn from the light emission part to a corner of the surface light emission region of the light conductive plate is drawn from an end of the recess, the V-groove and the second diffusion patterns are provided not to get over the virtual line segment.

16 Claims, 29 Drawing Sheets

OTHER PUBLICATIONS

Patent Abstracts of Japan, Publication No. 11-203923, Publication Date: Jul. 30, 1999, 22 pages.
Patent Abstracts of Japan, Publication No. 2000-030520, Publication Date: Jan. 28, 2000, 24 pages.
Patent Abstracts of Japan, Publication No. 10-293202, Publication Date: Nov. 4, 1998, 14 pages.
Patent Abstracts of Japan, Publication No. 10-199316, Publication Date: Jul. 31, 1998, 13 pages.
International Search Report issued for International application No. PCT/JP2004/017421 mailed on Dec. 28, 2004 and English translation thereof, 6 pages.

* cited by examiner

Prior Art

Prior Art

Prior Art

Prior Art

Prior Art

Prior Art

Prior Art

Prior Art

SURFACE LIGHT SOURCE EQUIPMENT AND APPARATUS USING THE SAME

TECHNICAL FIELD

The present invention relates to a surface light source equipment, and an apparatus, such as image display units, portable equipment, using the surface light source equipment.

BACKGROUND ART

Conventional Example 1

FIG. 1 is a schematic plan view showing a construction of a conventional surface light source equipment. The surface light source equipment 1 comprises a light emission part 2 in the form of a point light source, and a rectangular-shaped light conductive plate 2, and deflection patterns 5 are arranged in a surface light emission region (light emission area) 4 on a back surface of the light conductive plate 3 to be concentric round the light emission part 2. The deflection patterns 5 are provided by recessing the back surface of the light conductive plate 3 in the form of a triangular prism to comprise a reflection surface, by which an incident light is total-reflected toward a surface (a light outgoing surface) of the light conductive plate 3. Thus, when a light outgoing from the light emission part 2 and conducted into the light conductive plate 3 is made incident upon the deflection patterns 5 to be total-reflected there, a part of a reflected light outgoes outside from the surface of the light conductive plate 3 and the remaining part is reflected by the surface of the light conductive plate 3 to return into the light conductive plate 3.

As viewed in a direction perpendicular to the surface of the light conductive plate 3, a normal line to a reflection surface of the deflection pattern 5 is made in parallel to a direction (a direction substantially in parallel to a direction connecting between the deflection pattern 5 and the light emission part 2) of a light made incident upon the reflection surface. Accordingly, when viewed in a direction perpendicular to the light conductive plate 3, a light total-reflected by the deflection patterns 5 and a light total-reflected by the front and back surfaces of the light conductive plate 3 advance in the same direction as that before reflection without being curved. Consequently, a light outgoing in a range of, for example, $\Delta\theta$ shown in FIG. 1 outgoes little by little from the surface of the light conductive plate 3 while being confined in the range of $\Delta\theta$.

In order to cause the surface light emission region 4 in the surface light source equipment 1 to emit a light in uniform brightness, a quantity of a light distributed in the range of $\Delta\theta$ must be in proportion to an area of the surface light emission region 4 (a region indicated by oblique lines in FIG. 1) included in the range of $\Delta\theta$, as disclosed in JP-A-10-255530 (Patent Document 1). Therefore, a quantity of a light distributed in a $\theta$ direction in the light conductive plate 3 from the light emission part 2 must be in proportion to a length, over which the light passes through the surface light emission region 4 in the $\theta$ direction, so that an ideal light quantity distribution (referred below to as target distribution) in respective directions (the $\theta$ direction) in the light conductive plate 3 is indicated by broken lines in FIGS. 3, 6, and 11. A direction, in which relative intensity in the target distribution is maximum, corresponds to a direction passing through a corner distant from the light emission part 2 in an effective area.

FIG. 2 shows, in enlarged scale, the neighborhood of the light emission part 2 in the surface light source equipment 1. With the surface light source equipment 1, a light incident surface 6 of the light conductive plate 3 is formed to be flat, a light 7 outgoing from the light emission part 2 is refracted and collected forward due to a difference in refractive index between an air and the light conductive plate 3 when being made incident upon the light incident surface 6. Accordingly, an actual light quantity distribution becomes one indicated by a solid line in FIG. 3. Making a comparison between the light quantity distribution indicated by the solid line and the target distribution, a quantity of an incident light is larger than that in the target distribution in a region of $\theta < 40°$. That is, a light quantity is surplus in the region. Moreover, in a region of $\theta < 40°$, a quantity of an incident light in the target distribution is larger than that in the actual distribution. That is, a light quantity in this region is insufficient. Therefore, with such surface light source equipment 1, dark parts 8 indicated by oblique lines in FIG. 4 are generated at corner portions of the surface light emission region 4 of the light conductive plate 3 and so uniformity in brightness cannot be achieved. Also, the surface light source equipment 1 is low in brightness due to a bad efficiency of light.

Conventional Example 2

FIG. 5 is a view showing, in enlarged scale, a further conventional example, and minute semi-circular recesses 9 are formed at a predetermined pitch on a light incident surface 6 of a light conductive plate 3. Since the semi-circular recesses 9 are formed on the light incident surface 6, a light 7 is diffused by the semi-circular recesses 9, so that the light 7 made incident upon the light conductive plate 3 spreads to be easily distributed to the corners in the surface light emission region 4.

FIG. 6 is a graph representing a light quantity distribution of the conventional example. In the conventional example, a surplus light in a direction of $\theta = 0°$ decreases and a light distributed to the corner portions also increases. With such conventional example, however, a light is not so high in efficiency and a quantity of a distributed to the corner portions in the surface light emission region 4 is still insufficient.

In a method of forming the semi-circular recesses 9 on the light incident surface 6, sides of the semi-circular recesses 9 can be increased in inclination by decreasing the semi-circular recesses 9 in curvature and increasing the semi-circular recesses 9 in height, whereby it is possible to increase a light in degree of diffusion. With such method, however, a light is not further diffused when an inclination beyond a certain degree is provided. The reason for this is that a light 7 diffused by the semi-circular recesses 9 impinges against adjacent semi-circular recesses 9 to be inhibited from diffusing toward the corner portions as shown in FIG. 7.

Also, as shown in FIG. 8, when the semi-circular recesses 9 are made small in order to make diffusion toward the corner portions hard to be inhibited, diffusion of the light 7 is decreased and so the light 7 cannot be spread sufficiently toward the corner portions.

Because of such reasons, as shown in FIG. 9, considerably large dark parts 8 are generated and the corner portions of the surface light source equipment become dark although those corner portions, which the light 7 does not reach, are smaller than those in the conventional example 1.

Conventional Example 3

FIG. 10 is a view showing, in enlarged scale, a further conventional example, and minute rectangular recesses 10 are formed at a predetermined pitch on a light incident surface 6 of a light conductive plate 3. Since a light 7 can be increased in degree of diffusion by forming the rectangular recesses 10 on the light incident surface 6, a light fed in a direction toward the light conductive plate 3 is increased in quantity.

With the surface light source equipment provided with such rectangular recesses 10, horizontal and vertical sides of the rectangular recesses 10 can refract a light 7, so that its light quantity distribution makes an intensity distribution indicated by a solid line in FIG. 11. With such conventional example, a light distributed to corner portions is assuredly increased but a quantity of a light in a direction θ=0° is surplus and a quantity of a light in a direction θ=45° becomes insufficient. Consequently, corner portions in the surface light emission region 4 become bright as shown in FIG. 12 but a quantity of a light in a direction θ=45° becomes insufficient and dark parts 8 (regions indicated by oblique lines) are generated obliquely.

[Patent Document 1] JP-A-10-255530

DISCLOSURE OF THE INVENTION

Problems that the Invention is to Solve

It is an object of the invention to dissolve a partial dark part in a surface light emission region to improve uniformity of the surface light emission region in brightness.

Means for Solving the Problems

The invention provides a surface light source equipment comprising a light conductive plate, by which a light introduced from a light incident surface is spread on a substantially whole light outgoing surface to outgo outside from the light outgoing surface, and a light source arranged in opposition to the light incident surface of the light conductive plate and being small as compared with a width of the light conductive plate, wherein a plurality of recesses being uniform in a direction perpendicular to the light outgoing surface are arranged as first diffusion patterns in a region, which faces the light source, of the light incident surface, on the light incident surface, the first diffusion patterns comprise a surface, from which a light outgoes in a first direction, which is substantially the same as a direction of a normal line to the light incident surface, a surface, from which a light outgoes in a second direction, which is directed toward a corner close to the light incident surface of the light conductive plate, and a surface, from which a light outgoes in a direction interposed between the first direction and the second direction, and a ratio of a quantity of a light, per unit angle, incident upon the light conductive plate from the light incident surface and an area of the light outgoing area of the light conductive plate per unit angle as viewed from a light source is substantially constant irrespective of an angle.

With the surface light source equipment of the invention, the first diffusion patterns comprise a surface, from which a light outgoes in a first direction, which is substantially the same as a direction of a normal line to the light incident surface, a surface, from which a light outgoes in a second direction, which is directed toward a corner close to the light incident surface of the light conductive plate, and a surface, from which a light outgoes in a direction interposed between the first direction and the second direction, so that a light can be distributed in proper quantities in respective directions and a ratio of a quantity of a light, per unit angle, incident upon the light conductive plate from the light incident surface and an area of the light outgoing area of the light conductive plate per unit angle as viewed from a light source can be made substantially constant irrespective of an angle. Therefore, the whole surface light emission region of the surface light source equipment can be made to emit uniformly to improve uniformly of brightness.

In an embodiment of the surface light source equipment according to the invention, the first diffusion patterns comprise a rectangular-shaped or trapezoidal-shaped recess, and a concave groove or a projection provided centrally on a side of the recess in parallel to the light incident surface.

According to the embodiment, a concave groove or a projection is formed centrally on a side of the recess in parallel to the light incident surface, a diffuser comprising a rectangular-shaped or trapezoidal-shaped recess enables the concave groove or the projection to feed a light in a direction, in which a light quantity is insufficient, in particular, in a diagonal direction of the light conductive plate, thus enabling approaching a target light quantity distribution.

In the embodiment, desirably, the recesses are provided periodically on the light incident surface and a width of the concave groove or the projection is equal to or less than ⅓ of the period of the recesses. By making a width of the concave groove or the projection equal to or less than ⅓ of the period of the recesses, it is possible to prevent a light outgoing obliquely from becoming too much and to balance a light outgoing forward and a light outgoing obliquely with each other.

Also, according to the embodiment, desirably, the concave groove or the projection comprises a V-grooved groove or a V-shaped projection. The concave groove or the projection having such shape enables a light, which is incident from a light source, to efficiently outgo in a diagonal direction of the light conductive plate.

In a further embodiment of the surface light source equipment according to the invention, the first diffusion patterns comprise a rectangular-shaped or trapezoidal-shaped recess, and a corner of the recess on an opposite side to a light incident side is formed to be arcuate.

According to the further embodiment of the invention, since a corner of the recess on an opposite side to the light incident surface is formed to be arcuate, the arcuate corner can feed a light in a direction, in which a diffuser comprising the rectangular-shaped or trapezoidal-shaped recess causes insufficiency of light quantity, in particular, in a diagonal direction of the light conductive plate, thus enabling approaching a target light quantity distribution. Also, since the corner of the recess is rounded, the property of mold releasing at the time of injection-molding of the light conductive plate is favorable to make the first diffusion patterns hard to wear by friction at the time of mold releasing. Further, a mold die becomes easy to manufacture and is improved in accuracy.

In a still further embodiment of the surface light source equipment according to the invention, the first diffusion patterns comprise a rectangular-shaped or trapezoidal-shaped recess, and a far end surface of the recess on an opposite side to a light incident side is formed to be arcuate.

According to the still further embodiment of the invention, since a far end surface of the recess on an opposite side to a light incident side is formed to be arcuate, the arcuate corner can feed a light in a direction, in which a diffuser comprising the rectangular-shaped or trapezoidal-shaped recess causes insufficiency of light quantity, in particular, in a diagonal direction of the light conductive plate, thus enabling approaching a target light quantity distribution. Also, since the far end surface of the recess is rounded, the property of mold releasing at the time of injection-molding of the light conductive plate is favorable to make the first diffusion patterns hard to wear by friction at the time of mold releasing. Further, a mold die becomes easy to manufacture and is improved in accuracy.

In the respective embodiments, a second diffusion pattern, in the form of a V-groove, a V-shaped projection, or an arc, is desirably formed on the light incident surface to be intermediate between the first diffusion patterns. By providing such second diffusion pattern intermediate between the first diffusion patterns, it is possible to further increase a light outgoing in a diagonal direction of the light conductive plate.

Further, in the respective embodiments, desirably, supposing a virtual line segment in parallel to a line segment passing through an end of the first diffusion pattern in contact with the light incident surface and passing through the light source and an end of a surface light emission region of the light conductive plate, the first diffusion patterns and the second diffusion pattern do not get over the virtual line segment. According to the embodiment, a light outgoing toward a corner of the surface light emission region of the light conductive plate from the side of the recess can be prevented from being shaded by the concave groove and the corner can be prevented from becoming dark.

Also, in the respective embodiments, a corner between the light incident surface of the light conductive plate and a surface of the first diffusion pattern in contact with the light incident surface may be chamfered or rounded. By chamfering or rounding the portion, dispersion becomes hard to be generated in shape of the recess due to dispersion in molding when the light conductive plate is molded, and dispersion in light quantity distribution is also decreased.

In addition, the surface light source equipment according to the invention is applicable to an image display for liquid-crystal display, a portable equipment such as portable telephones, etc.

In addition, constituent elements, described above, in the invention can be combined together as far as possible.

EFFECT OF THE INVENTION

The surface light source equipment according to the invention enables dissolving a partial dark part in a surface light emission region to improve uniformity of brightness in the whole surface light emission region.

DESCRIPTION OF REFERENCE NUMERALS AND SIGNS

Figure 1:
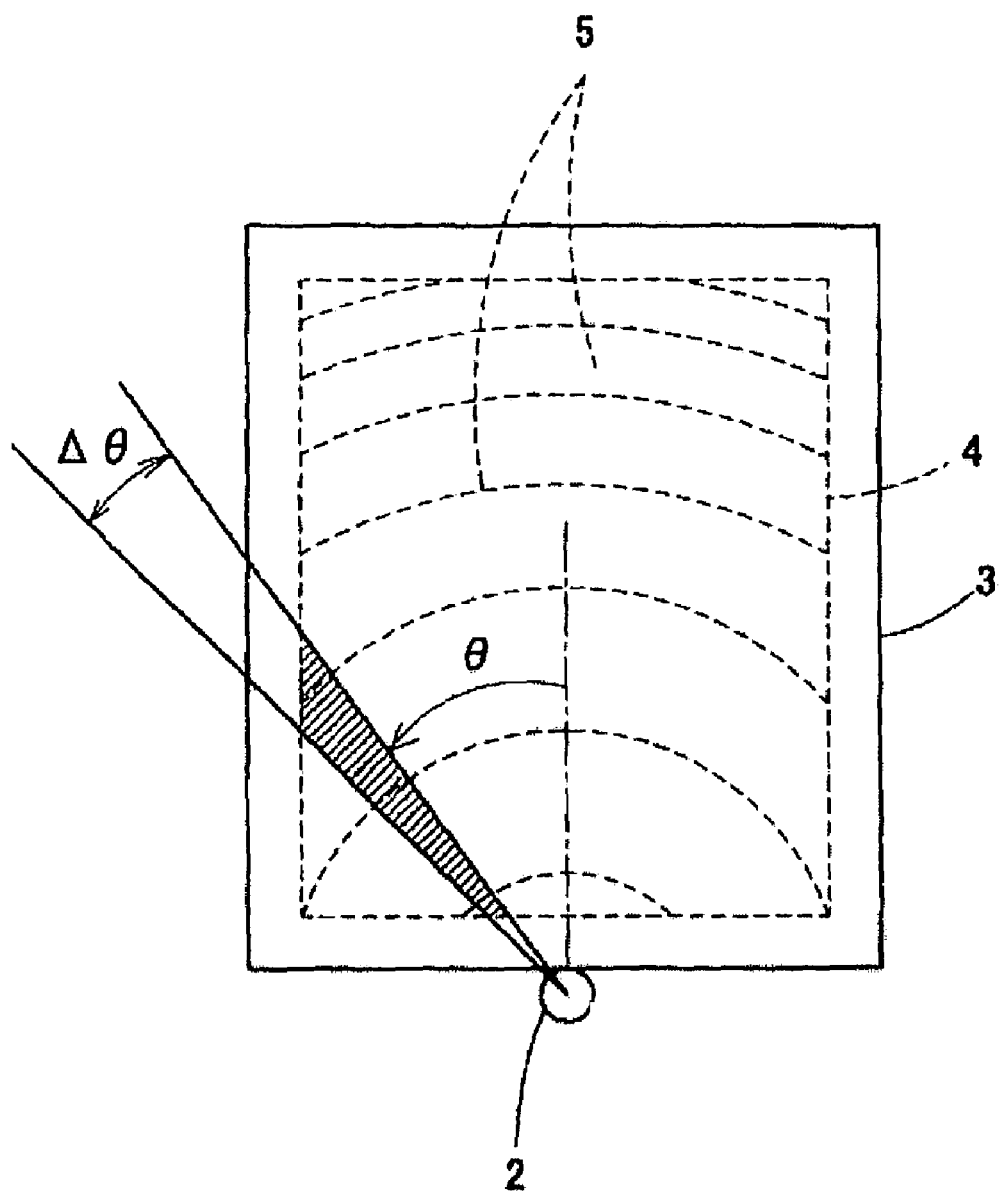
FIG. 1 is a schematic plan view showing a surface light source equipment of conventional example I using a light emission part in the form of a point light source.
Figure 2:
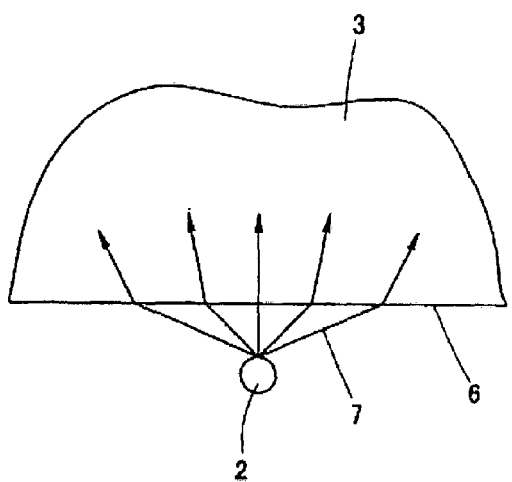
FIG. 2 is an enlarged view showing a neighborhood of the light emission part of the surface light source equipment of the conventional example 1 and beams of light made incident upon a light conductive plate from the light emission part.

11: surface light source equipment
12: light emission part
13: light conductive plate
14: reflecting sheet
15: surface emission region
16: non-emission region
17: deflection pattern
18: recess
19: light incident surface
21: diffuser
22: first diffusion pattern
22A: recess
22B: V-groove
23: second diffusion pattern

BEST MODE FOR CARRYING OUT THE INVENTION

Embodiments of the invention will be described below in detail with reference to the drawings.

Embodiment 1

Figure 13:
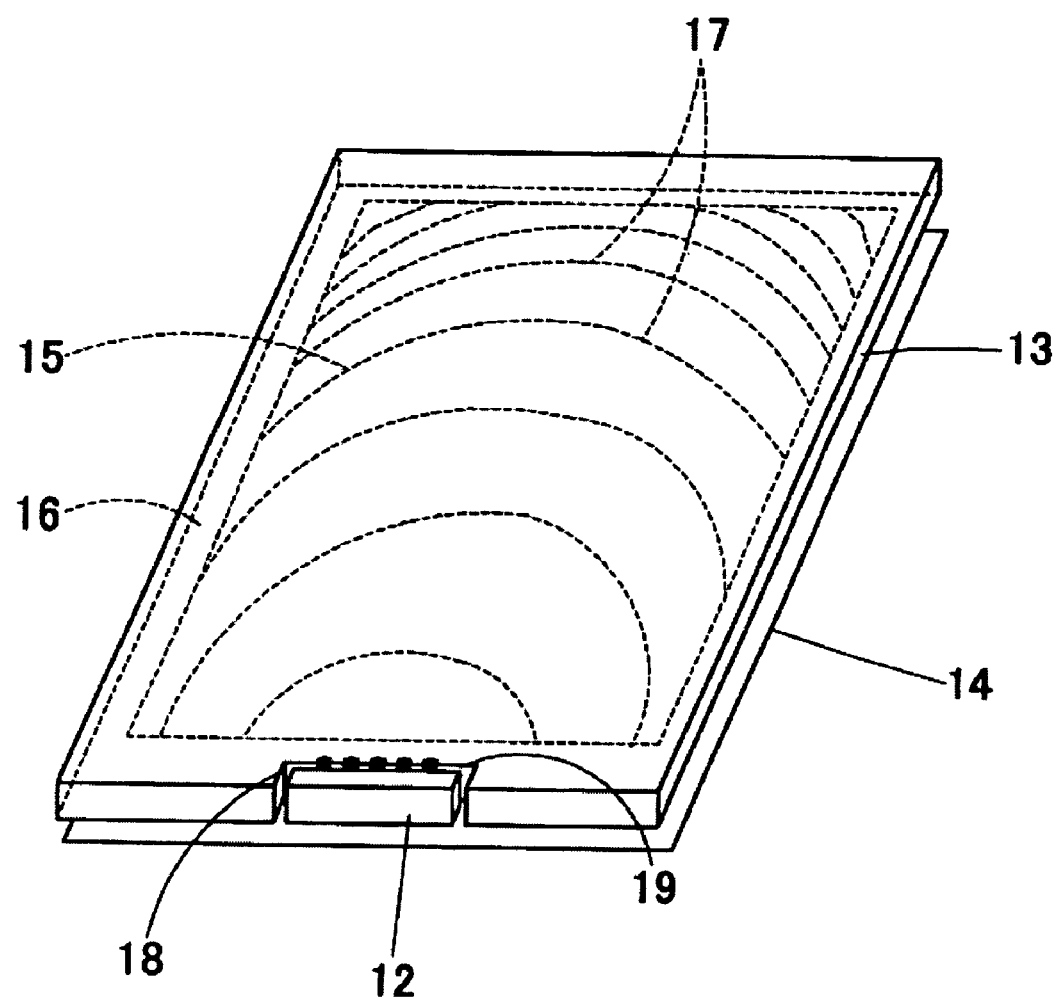
FIG. 13 is a perspective view showing a surface light source equipment according to Embodiment 1 of the invention.

FIG. 13 is a perspective view showing a surface light source equipment 11 according to Embodiment 1 of the invention. The surface light source equipment 11 comprises a light emission part 12, a light conductive plate 13, and a reflecting sheet 14. The light emission part 12 comprises a single or a plurality of light emitting elements, such as LED, packaged in a resin. The light conductive plate 13 is formed from a transparent resin, such as polycarbonate resin, methacrylic resin having a high refractive index, to be in the form of a rectangular plate, a plurality of, or a multiplicity of deflection patterns 17 are formed in a surface light emission region 15 on a back surface thereof, and a non-emission region 16 free of any patterns is provided around the surface light emission region 15. The reflecting sheet 14 is formed from a white resin sheet, aluminum foil, etc. to be arranged in a position in opposition to the back surface of the light conductive plate 13. A recess 18 is formed centrally on a short side of the light conductive plate 13, and the light emission part 12 is received in the recess 18.

Figure 14:
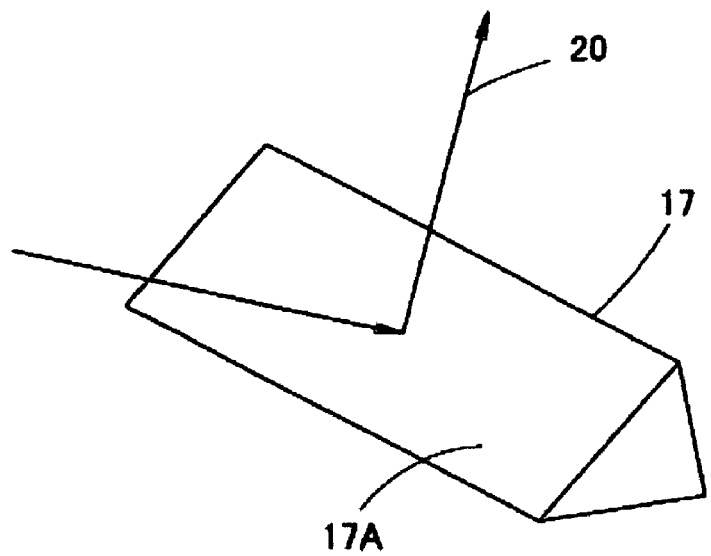
FIG. 14 is a perspective view showing a single deflection pattern provided on a light conductive plate of the surface light source equipment shown in FIG. 13.
Figure 15:
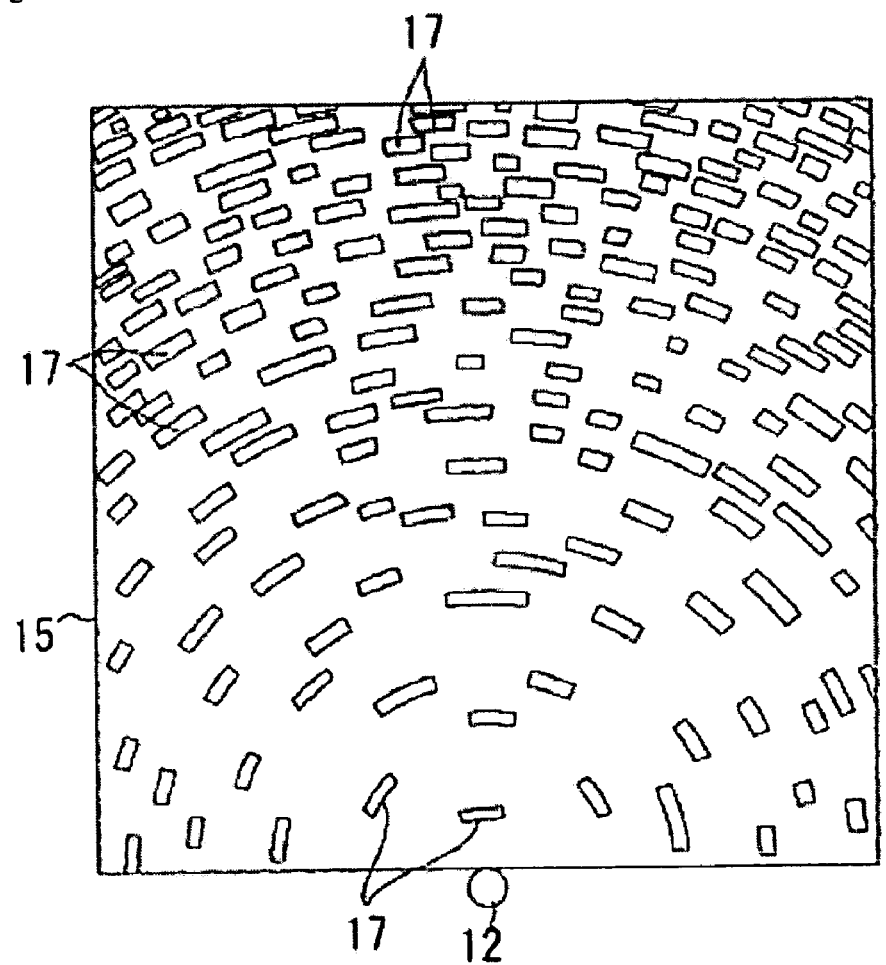
FIG. 15 is a view showing an arrangement of deflection patterns formed in a surface light emission region of the light conductive plate 1.

The deflection pattern 17, a profile of which is shown in FIG. 14, is formed by recessing the back surface of the light conductive plate 13 in the form of a triangular groove. As shown in FIG. 15, the respective deflection patterns 17 are arranged to be concentric about the light emission part 12 (strictly, an image of light emission part 12 as viewed from inside the light conductive plate 13), and as viewed in a direction perpendicular to a surface of the light conductive plate 13, lengthwise direction of the deflection patterns 17 are perpendicular to a direction, which connects between them and the light emission part 12. That is, as viewed in the direction perpendicular to the surface of the light conductive plate 13, a normal line to a reflection surface of the diffusion pattern 5 is directed parallel to a direction (a direction substantially in parallel to a direction connecting between the deflection pattern 17 and an image of the light emission part 12) of a light incident upon the reflection surface.

Figure 16:
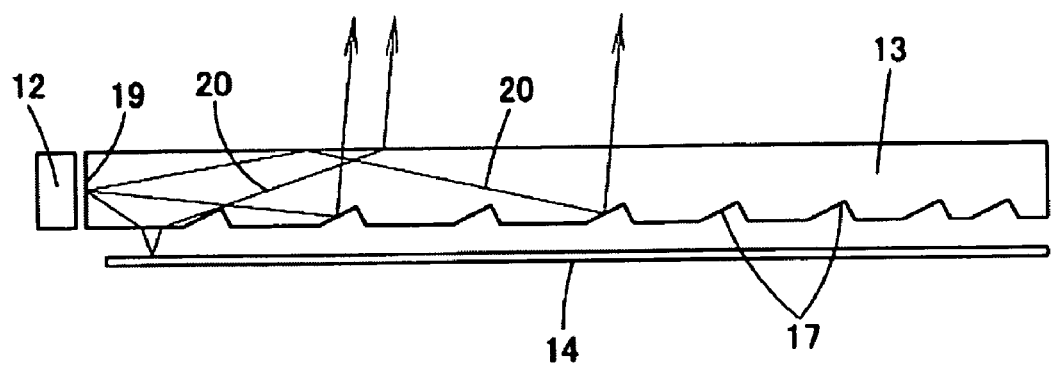
FIG. 16 is a view showing the behavior of a light in the surface light source equipment of Embodiment 1.

FIG. 16 is a view showing the behavior of a light in the surface light source equipment 11. A light 20 outgoing from the light emission part 12 enters the light conductive plate 13 from a light incident surface 19 and advances in a direction distant from the light emission part 12 while repeating total reflection on front and back surfaces of the light conductive plate 13. On the way, a light leaking from the back surface of the light conductive plate 13 is reflected by the reflecting sheet 14 to thereby be returned into the light conductive plate 13, so that loss in light quantity due to leakage is inhibited. When a light 20 propagated in the light conductive plate 13 is made incident upon a reflection surface 17A of the deflection pattern 17, the light 20 is total-reflected by the reflection surface 17A. The light total-reflected by the deflection pattern 17 is directed to the surface (a light outgoing surface) of the light conductive plate 13, a part of the light outgoes outside from the surface, and the remaining part of the light is reflected by the surface to be again conducted in the light conductive plate 13. The light thus conducted in the light conductive plate 13 is take out little by little from the surface of the light conductive plate 13 to make the surface light emission region 15 emit light.

Here, since the respective deflection patterns 17 are arranged to be perpendicular to a direction connecting between them and an image of the light emission part 12 as viewed in the direction perpendicular to the surface of the light conductive plate 13, a light total-reflected by the deflection patterns 17 and a light total-reflected by the front and back surfaces of the light conductive plate 13 advance in the same direction as that before reflection without being curved, and the light 20 advances in the light conductive plate 13 without diffusion.

Figure 17:
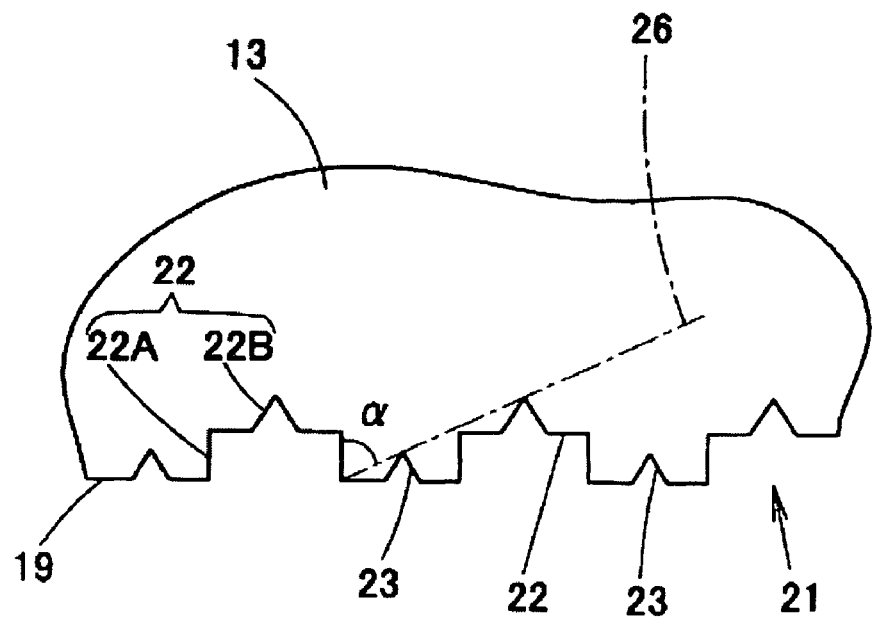
FIG. 17 is a plan view showing a pattern configuration of a diffuser formed on a light incident surface of the light conductive plate.

An inner surface of the recess 18, which receives the light emission part 12, defines the light incident surface 19. FIG. 17 is a plan view showing a configuration of a diffuser 21 formed on the light incident surface 19. The diffuser 21 formed on the light incident surface 19 periodically arranges thereon first minute diffusion patterns 22, in which a V-groove 22B is formed in the inner part of a rectangular-shaped recess 22A, and second diffusion patterns 23 comprising a minute V-groove formed centrally between the first diffusion patterns, and the period of the patterns is small as compared with a size of a LED chip in the light emission part 12. In addition, the diffusion patterns 22, 23 are formed to have a uniform cross sectional shape throughout in a thickness-wise direction of the light conductive plate 13.

Figure 18:
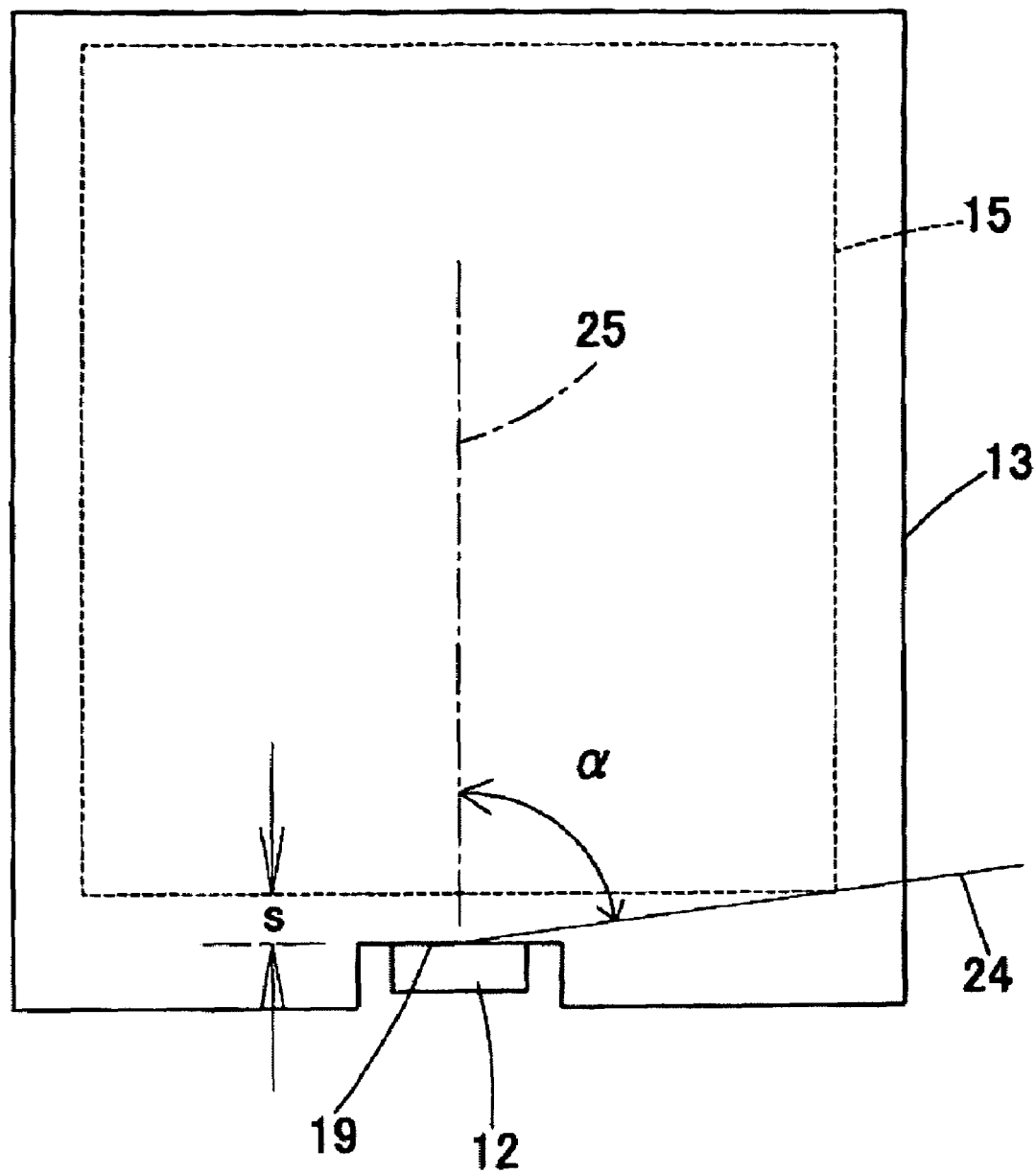
FIG. 18 is a view illustrating the definition of an angle α.
Figure 19:
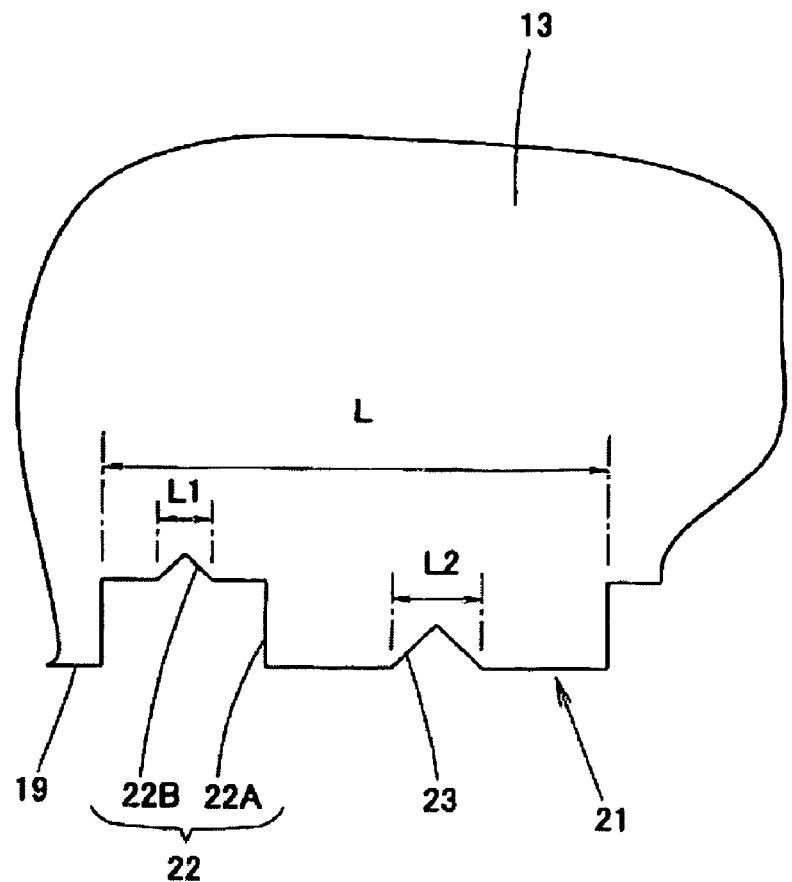
FIG. 19 is a view illustrating the definition of a pattern period L of a diffuser, a width L1 of a V-groove, and a width L2 of a second diffusion pattern.

Here, assuming that a virtual line segment 26 is drawn from an end of the recess 22A to form an angle α relative to a side surface of the rectangular-shaped recess 22A as shown in FIG. 17 where α indicates an angle formed between a line segment 24, which connects between a center of the light incident surface 19 of the light conductive plate 13 and a corner of the surface light emission region 15, and a normal line 25 to the light incident surface 19 as shown in FIG. 18, the V-groove 22B of the first diffusion pattern 22 and the second diffusion pattern 23 in the form of a V-groove do not get over the virtual line segment 26. Also, as shown in FIG. 19, where L indicates a pattern period of the diffuser 21, L1 indicates a width of the V-groove 22B, and L2 indicates a width of the second diffusion pattern 23, the widths L1, L2 meet $L1 < L/3$ $L2 < L/3$            (1)

In addition, a distance S between the light incident surface 19 (outer surfaces of the diffusion patterns 22, 23, and so forth) and the surface emission region 15 is fairly larger than a height (a height of the rectangular-shaped recess 22A+a height of the V-groove 22B) of the diffuser 21 so that the diffusion patterns 22, 23 do not enter the surface light emission region 15.

Figure 20:
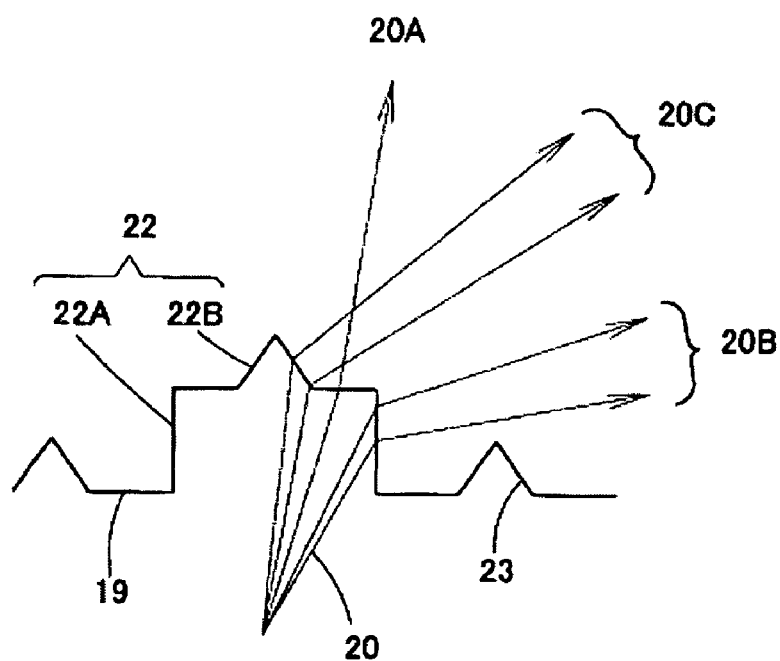
FIG. 20 is a view illustrating an action of a first diffusion pattern.

FIG. 20 is a view illustrating an action of the first diffusion pattern 22. The first diffusion pattern 22 includes horizontal and vertical sides (the rectangular-shaped recess 22A) and oblique sides (the V-groove 22B), a light 20A made incident upon the horizontal side of the recess 22A, out of a light 20 made incident upon the first diffusion pattern 22, outgoes forward, a light 20B made incident upon the vertical side of the recess 22A outgoes toward corner portions, and a light 20C made incident upon the oblique side of the V-groove 22B outgoes diagonally. Likewise, a light made incident upon the second diffusion pattern 23 outgoes diagonally, and a light passing through flat surfaces on both sides of the second diffusion pattern 23 outgoes forward. Since the light 20A and the light 20B, which pass through the rectangular-shaped recess 22A, are the same in light quantity distribution as the case of conventional example 3, a quantity of a light is insufficient in diagonal directions, but a light can be fed diagonally by the V-groove 22B and the second diffusion pattern 23 in Embodiment 1 of the invention whereby it is possible to generally dissolve insufficiency of light quantity in diagonal directions. Also, the V-groove 22B produces an effect that a light quantity toward the front, which is surplus in conventional example 3, is decreased.

According to Embodiment 1 of the invention, since the V-groove 22B and the second diffusion pattern 23 are provided, the light 20B outgoing from the vertical side is partially interrupted by the V-groove 22B and the diffusion pattern 23. Since the V-groove 22B and the diffusion pattern 23 do not get over the virtual line segment 26 shown in FIG. 17, however, that light, which is interrupted by the V-groove 22B and the diffusion pattern 23, is only one outgoing toward the non-emission region 16, and the light 20B outgoing toward the corner of the surface light emission region 15 from the vertical side of the first diffusion pattern 22 is not interrupted by the V-groove 22B and the second diffusion pattern 23, so that it is possible to efficiently feed a light to the corners of the surface light emission region 15, and the corners are not insufficient in light quantity.

Also, since a limitation of not getting over the virtual line segment 26 is imposed, a quantity of a light fed diagonally can be compensated for by forming V-grooves on the first diffusion pattern 22 and the second diffusion pattern 23 although a light fed diagonally by the single V-groove 22B or the single second diffusion pattern 23 is decreased in quantity.

Also, when the formula (1) is met, it is possible to prevent the light 20A, which outgoes forward, from becoming too small in quantity, the light 20C, which outgoes diagonally, from becoming too much in quantity.

Figure 21:
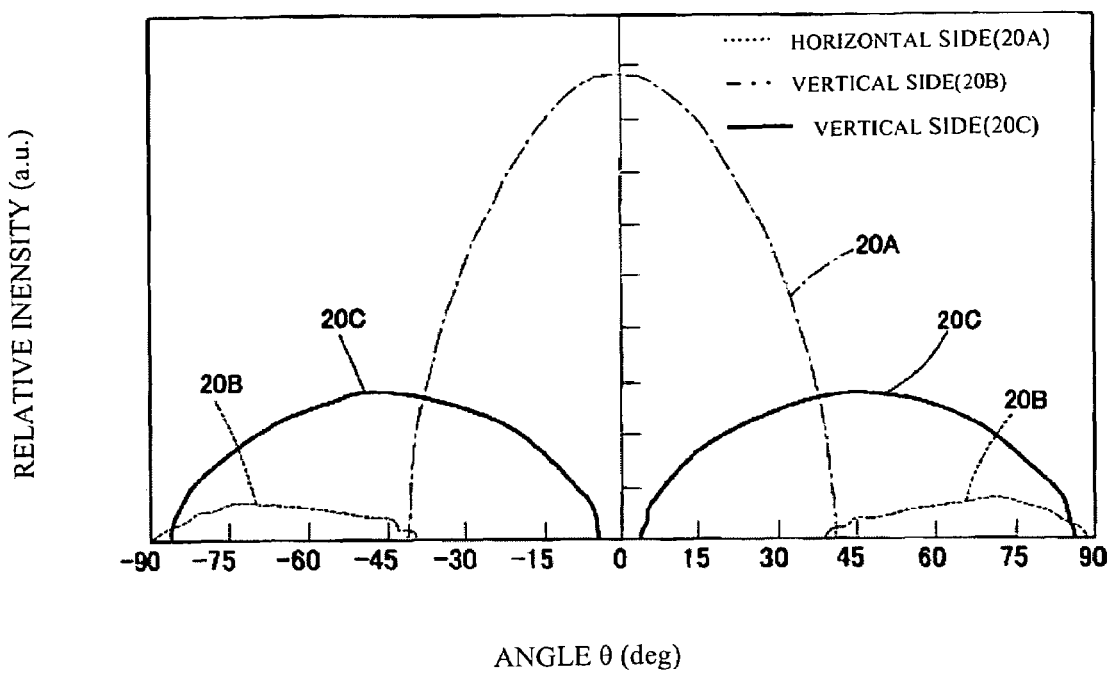
FIG. 21 is a graph individually representing the light quantity distribution of a light, which passes through a horizontal side of a diffuser, a light, which passes through a vertical side, and a light, which passes through an oblique side.
Figure 22:
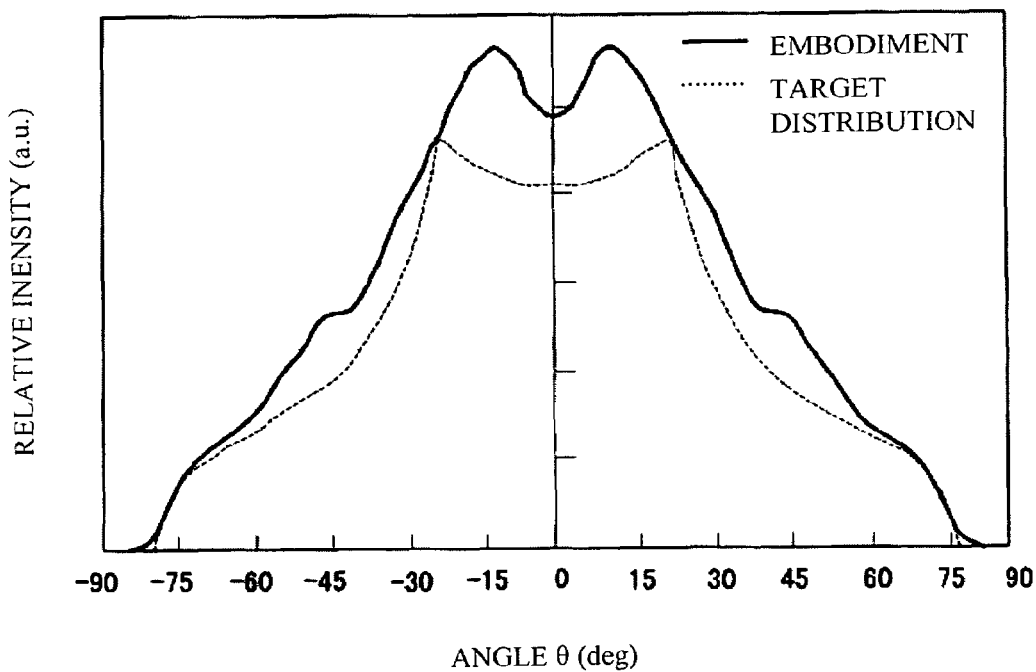
FIG. 22 is a graph representing a light quantity distribution, which is obtained by summing up the individual light quantities shown in FIG. 21, as a light quantity distribution of the Embodiment.

FIG. 21 is a graph individually representing the light quantity distribution of the light 20A, which passes through the horizontal side (the recess 22A) of the diffuser 21, the light 20B, which passes through the vertical side (the recess 22A), and the light 20C, which passes through the oblique sides (the V-groove 22B and the second diffusion pattern 23). When the light quantities are added together, there is obtained a light quantity distribution in the surface light source equipment 11 according to Embodiment 1 of the invention. This is shown in FIG. 22. As shown in FIG. 22, the light quantity distribution thus obtained of Embodiment 1 of the invention becomes one close to the target distribution. In addition, if necessary, the distribution of the deflection patterns 17 may be readjusted according to the light quantity distribution of Embodiment 1 whereby uniform brightness is obtained anywhere.

Figure 23:
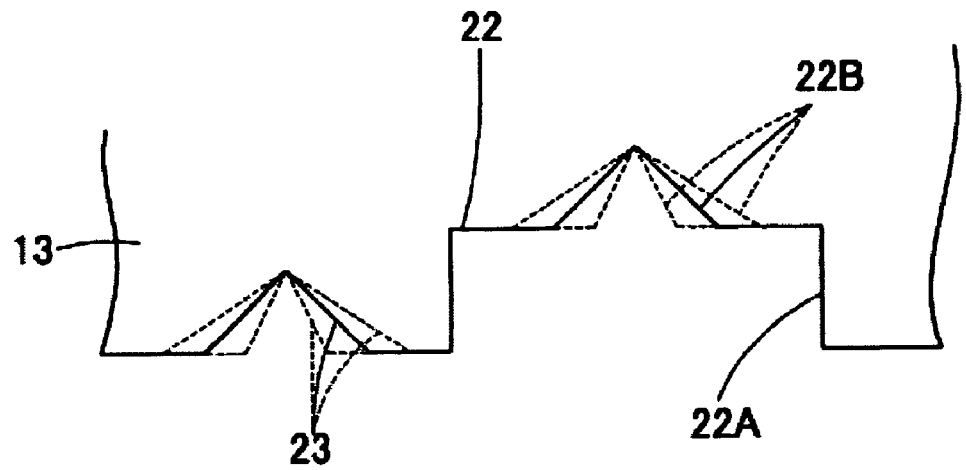
FIG. 23 is a view showing a modification of patterns of a diffuser.
Figure 24:
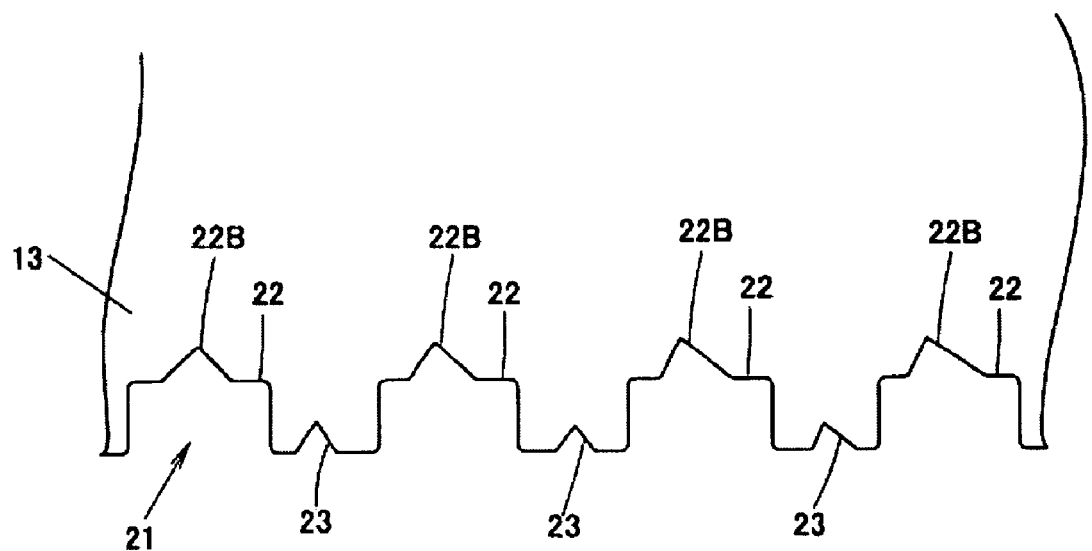
FIG. 24 is a view showing a further modification of patterns of a diffuser.

While according to Embodiment 1 an apex angle of the V-groove 22B and an apex angle of the second diffusion pattern 23 comprise a right angle (90°) as shown in FIG. 23, an angle of an apex may comprise an acute angle or an obtuse angle as indicated by broken lines in FIG. 23 unless their heights exceed the virtual line segment 26. Also, as shown in FIG. 24, the V-groove 22B and the second diffusion pattern 23 may be changed in shape according to a location.

Subsequently, an explanation will be given to enabling calculation of a pattern configuration, which provides for the basis of the diffuser 21, only through determination of a length of the vertical side, according to Embodiment 1. In addition, while an explanation is given here citing examples of numerical values, it goes without saying that the invention is not limited to numerical values used here.

Figure 25:
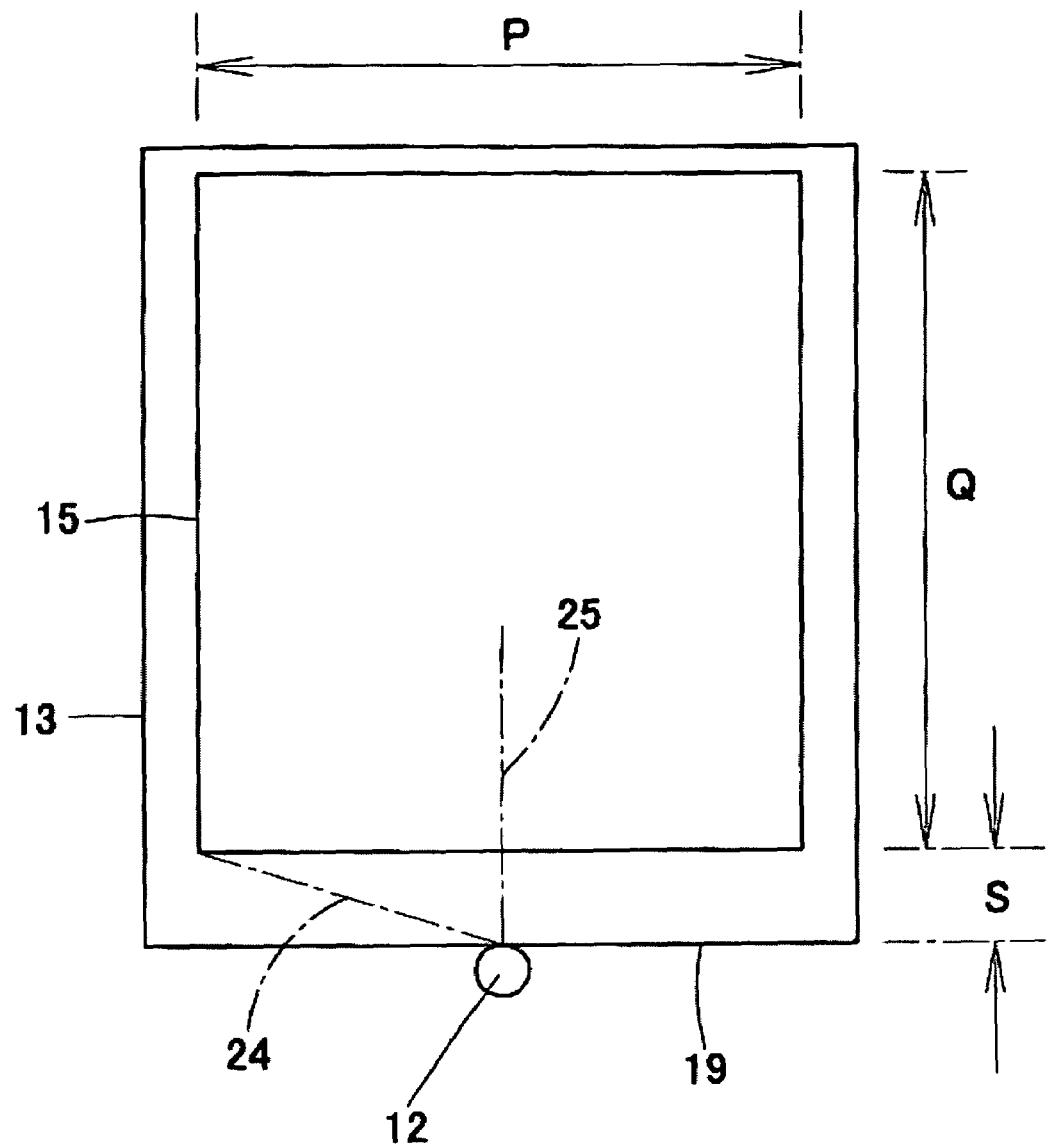
FIG. 25 is a view illustrating dimensional parameters of a surface light source equipment.

For example, let assume that the surface light emission region 15 in the surface light source equipment 11 is sized as shown in FIG. 25 to have a width P=30 mm and a length Q=40 mm, the light emission part 12 is opposed to the light incident surface 19 and arranged centrally on a short side of the light conductive plate 13, and a distance between the light emission part 12 (or the light incident surface 19) and the surface light emission region 15 is S=2.0 mm. In this case, an angle α formed between a line segment 24, which connects between the light emission part 12 and the surface light emission region 15, and a normal line 25, is $$\alpha = \arctan((P/2)/S) = 82.4° \quad (2)$$

In the case where a length H of vertical sides of the first diffusion pattern 22 on the light conductive plate 13 is 10 μm, an optimum pattern configuration of the diffuser 21 will be calculated.

Figure 26:
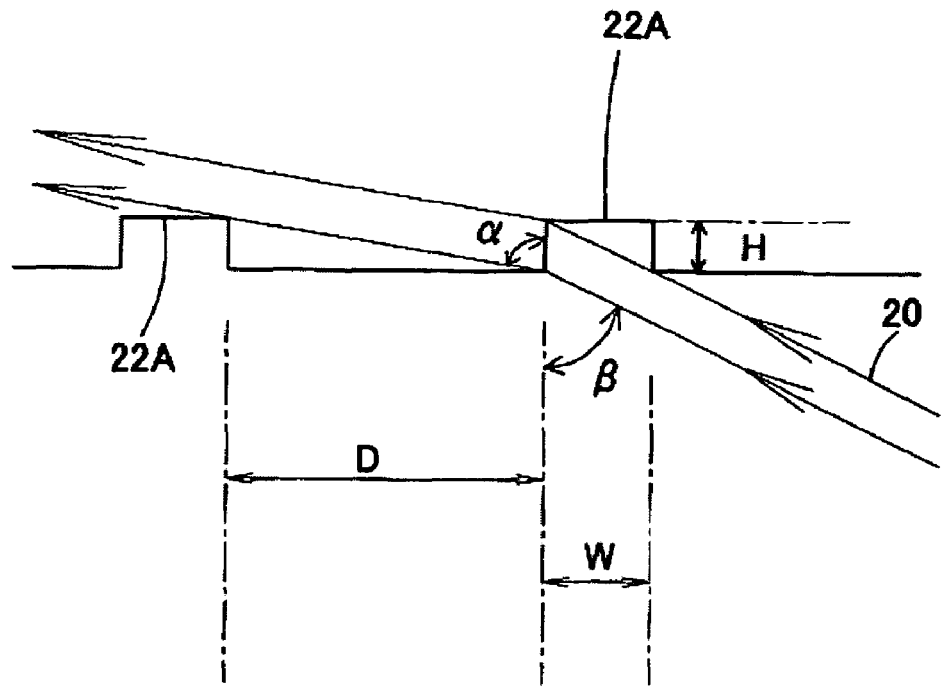
FIG. 26 is a view illustrating a method of determining a height of and an interval between rectangular-shaped recesses on the basis of the height of recesses.

In order to cause a light, which passes through the vertical side of the first diffusion pattern 22, to outgo in a direction of α=82.4° in the light conductive plate 13 in the case where the light conductive plate 13 has a refractive index of 1.53, it is necessary to make a light incident at an angle β=78.3° (an incident angle of 11.7°) to the vertical side. First, let consider only a rectangular-shaped recess 22A in FIG. 26 and assume that H indicates a height H (=10 μm) of the recess 22A, W indicates a width of the recess 22A, and D indicates an interval between the recesses 22A. As shown in FIG. 26, in order to make a light 20 of β=78.3° incident on a whole vertical side without interruption, the width W of the recess 22A suffices to meet $$W = H \times \tan \beta = 48.3 \ \mu m \quad (3)$$

Also, likewise, in order to prevent a light 20, which outgoes from the vertical side at an angle α=82.4°, from being interrupted by adjacent recesses 22A, the interval D in FIG. 26 suffices to meet $$D = H \times \tan \beta = 75.0 \ \mu m \quad (4)$$

Accordingly, a pattern period L of the first diffuser is represented by $$L = W + D = 123.3 \ \mu m \quad (5)$$

Figure 27:
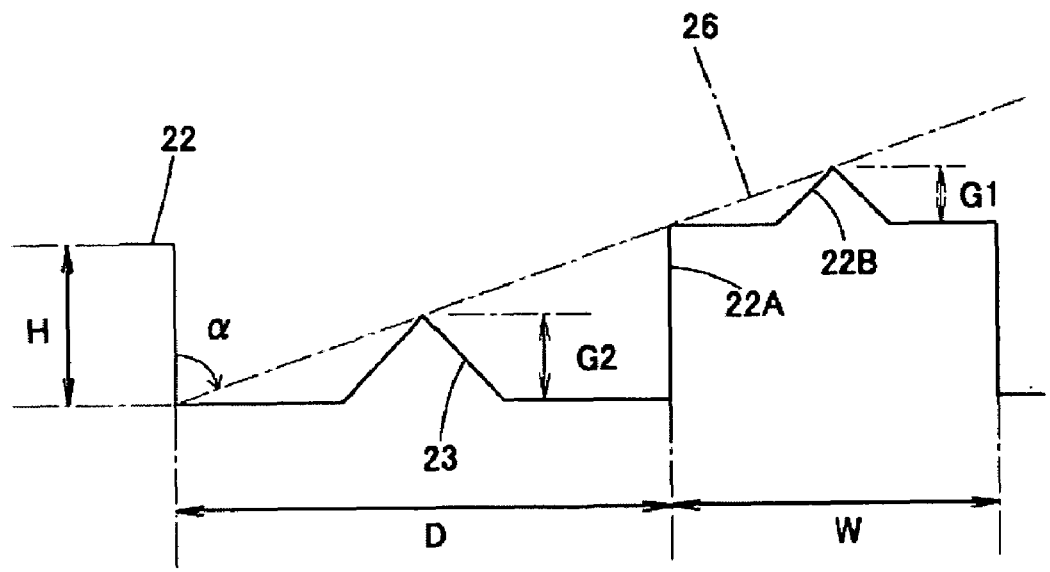
FIG. 27 is a view illustrating a method of determining a height of a V-groove and a height of second diffusion patterns 23.

Subsequently, let consider heights of the V-groove 22B and the second diffusion pattern 23. As shown in FIG. 27, it suffices that a height G1 of the V-groove 22B and a height G2 of the second diffusion pattern 23 do not exceed the virtual line segment 26, for which α=82.4° is determined. Accordingly, the height G1 of the V-groove 22B is given by $$G1 \leq W/(2 \times \tan \alpha) = 3.5 \ \mu m \quad (6)$$

Likewise, the height G2 of the second diffusion pattern 23 is given by $$G2 \leq D/(2 \times \tan \alpha) = 5.0 \ \mu m \quad (7)$$

An upper limit of the height G2 is 5.0 μm.

Figure 28:
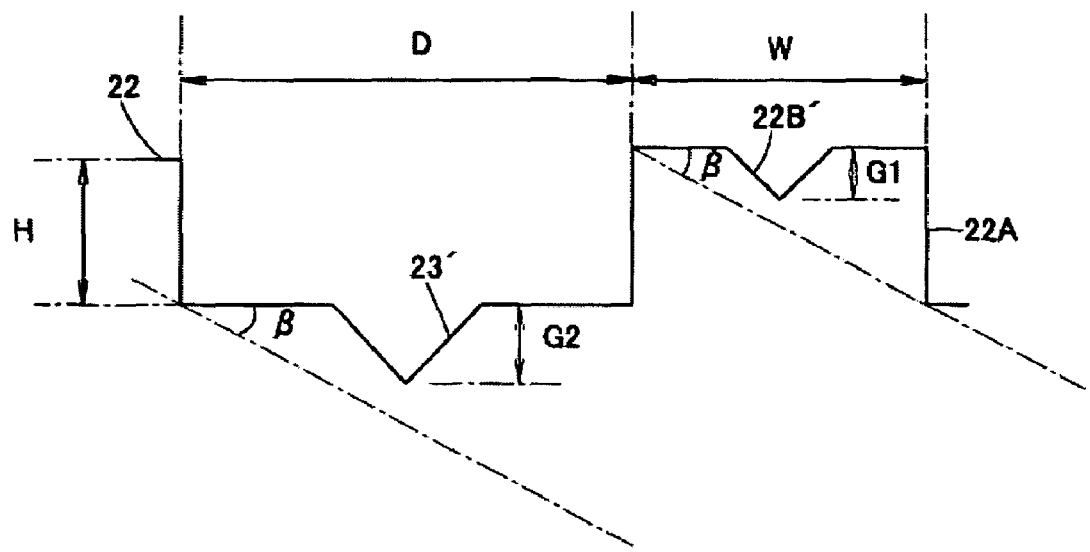
FIG. 28 is a view showing a further different pattern configuration of a diffuser.

Subsequently, an explanation will be given to various modifications of the invention. The V-groove 22B of the first diffusion pattern 22 and the second diffusion pattern 23 may comprise a V-shaped projection 22B' and a second diffusion pattern 23' in the form of a V-shaped projection as shown in FIG. 28. In this case, as seen from 28, it suffices to replace an angle α in the formulae (6), (7) by an angle β. Therefore, it suffices that a height G1 of the V-groove 22B' and a height G2 of the second diffusion pattern 23' be determined by $$G1 \leq W/(2 \times \tan \alpha)$$

$$G2 \leq D/(2 \times \tan \alpha)$$

Figure 29:
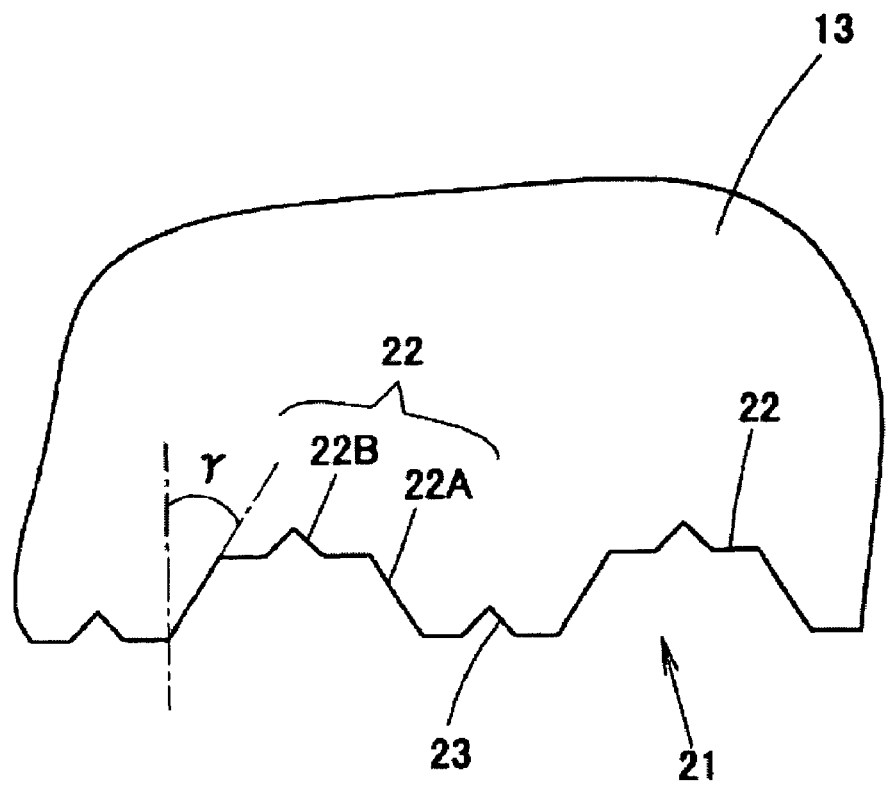
FIG. 29 is a view showing a further different pattern configuration of a diffuser.

Also, the recesses 22A of the first diffusion pattern 22 may be trapezoidal in shape. FIG. 29 shows both sides of the recesses 22A having an inclination γ=10°. According to such embodiment, in case of injection-molding a light conductive plate 13, the property of mold releasing from a metal mold at the time of molding can be heightened. In the embodiment, a method of determining dimensions of a pattern period, a first diffusion pattern 22, and a second diffusion pattern 23 can be performed in the same procedure as that described above.

Figure 30:
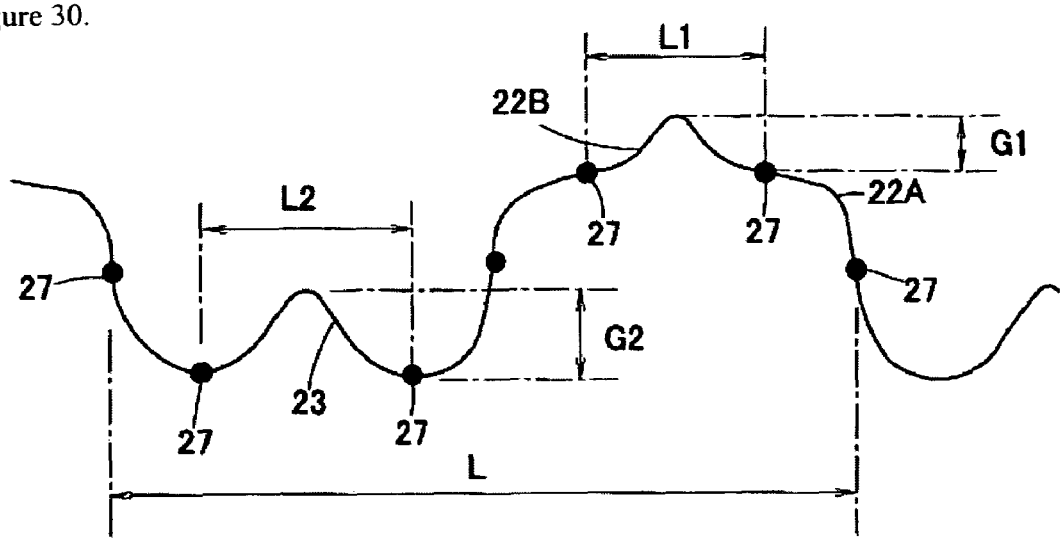
FIG. 30 is a view illustrating a method of determining a pattern period of patterns of a diffuser, which becomes blunt at the time of molding to be deformed, a V-groove, and a width of second diffusion patterns.

Also, in case of manufacturing a light conductive plate 13 by means of injection molding, the patterns of the diffuser 21 shown in FIG. 17 and the patterns of the diffuser 21 shown in FIG. 29 sometimes become blunt in shape as shown in FIG. 30 according to conditions of molding. In the case shown in FIG. 30, sides in parallel to the light incident surface 19 disappear according to conditions of molding, etc. In this case, since any surface as a reference is not found, it becomes difficult to prescribe widths and heights of the V-groove 22B and the second diffusion pattern 23 and a pattern period of the diffuser 21.

In such case, it suffices to define these values in the following manner. Since a rectangular shape assuredly includes two points 27 of inflection in one period as shown in FIG. 30 even when it becomes blunt, a length L of one period can be prescribed on the basis of a distance between the points 27 of inflection. Also, as to the V-groove 22B and the second diffusion pattern 23, points 27 of inflection are assuredly present before and behind the V-groove 22B and the second diffusion pattern 23 as shown in FIG. 30, it is possible to prescribe a width L1 and a height G1 of the V-groove 22B and a width L2 and a height G2 of the second diffusion pattern 23 on the basis of a distance between the points 27 of inflection. Therefore, it is possible to prescribe sizes, such as a pattern period L, widths L1, L2 of the V-groove 22B the second diffusion pattern 23, etc., on the basis of the points 27 of inflection, and it suffices that the sizes meet the formula (1).

Embodiment 2

Figure 31:
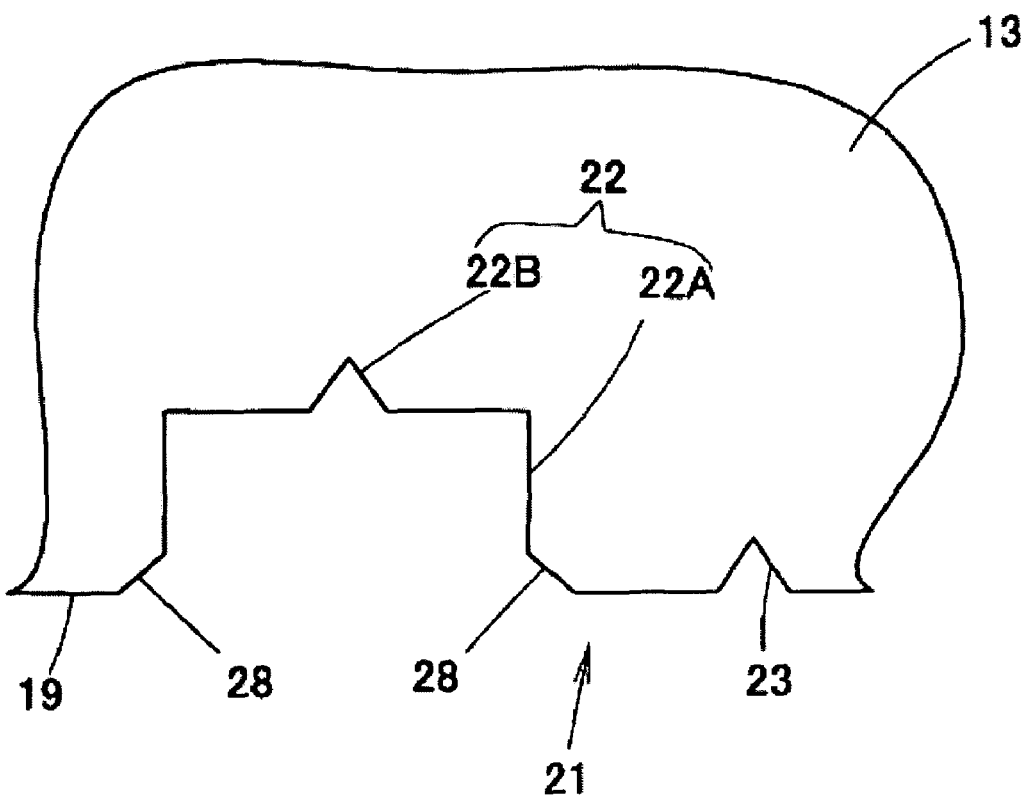
FIG. 31 is a view showing, in enlarged scale, a part of a diffuser according to Embodiment 2 of the invention.
Figure 32:
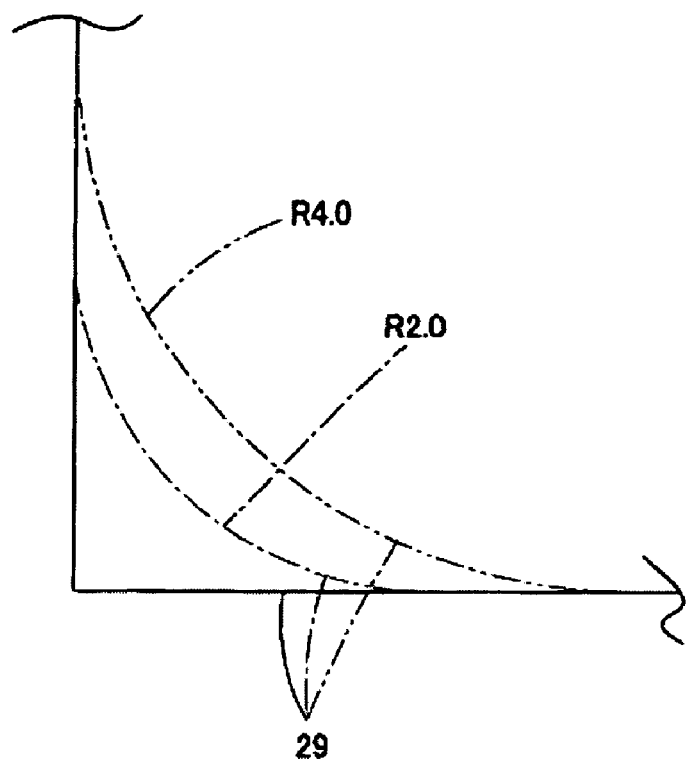
FIG. 32 is a schematic view showing an inner corner configuration of a transfer surface of a metal mold, by which a diffuser free of any inclined surface at corners thereof is molded.

FIG. 31 is a view showing, in enlarged scale, a part of a diffuser 21 according to Embodiment 2 of the invention. In Embodiment 2, inclined surfaces 28 are formed at an angle of 45° on corners between vertical sides of a recess 22A in a first diffusion pattern 22 and a light incident surface 19. In the case where such inclined surfaces 28 are not present and the corners are right-angled, the diffuser 21 is varied considerably in configuration and dispersion in light quantity distribution is increased in a light conductive plate 13 when round having a radius of curvature in the order of 2.0 μm (described as R2.0) to 4.0 μm (described as R4.0) is generated at inner corners of a transfer surface 29 of a metal mold as shown in FIG. 32.

Figure 33:
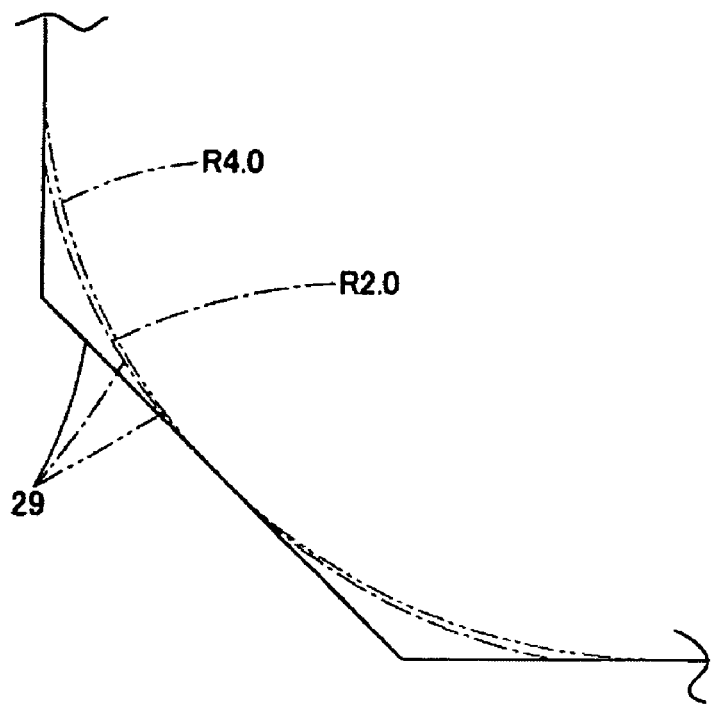
FIG. 33 is a schematic view showing an inner corner configuration of a transfer surface of a metal mold, by which a diffuser provided with inclined surfaces at corners thereof and chamfered, is molded.

In contrast, in the case where round having a radius of curvature in the order of 2.0 μm (R2.0) to 4.0 μm (R4.0) is generated at the inner corners of the transfer surface 29 of the metal mold as shown in FIG. 33 when inclined surfaces 28 are generated, dispersion is generated in a configuration of the diffuser 21 but dispersion become considerably small as compared with the case where any inclined surfaces 28 are not provided. Therefore, dispersion in light quantity distribution due to the property of transfer at the time of injection-molding can be decreased by forming inclined surfaces 28 between vertical sides of a recess 22A and a light incident surface 19.

Figure 34:
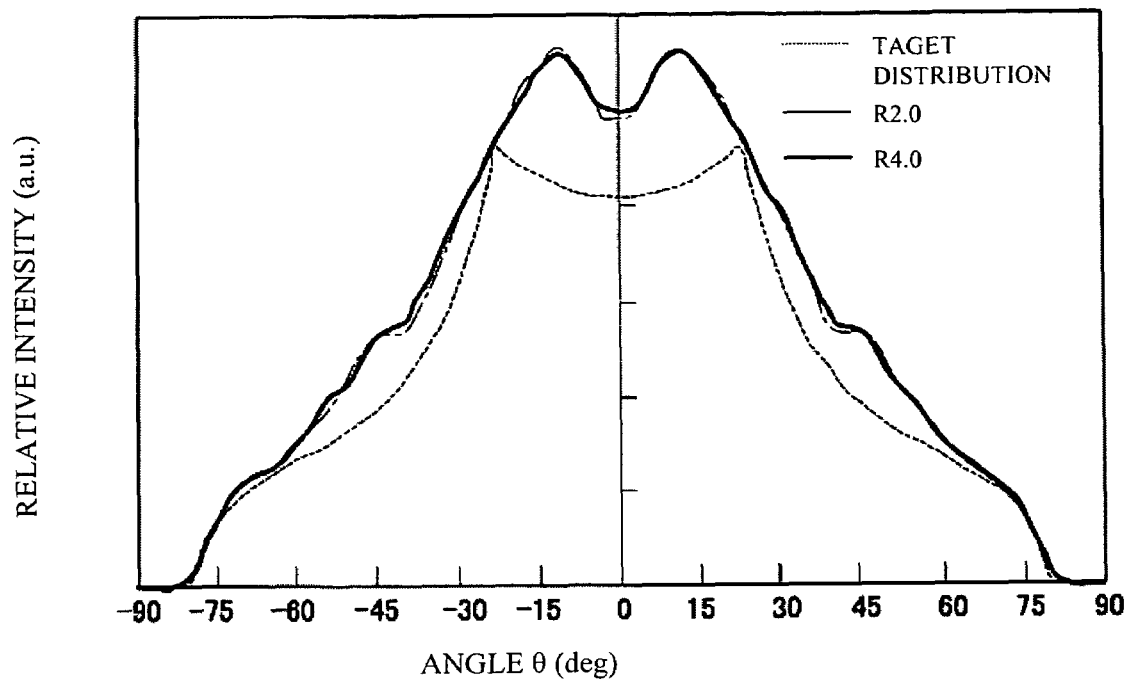
FIG. 34 is a view showing a comparison in light quantity distribution between the cases where round having a radius of curvature of 2.0 μm (R2.0) is generated at inner corners of a transfer surface of a metal mold and the case where round having a radius of curvature of 4.0 μm (r4.0) is generated, in a surface light source equipment of Embodiment 2.

FIG. 34 shows a comparison in light quantity distribution between the case where round having a radius of curvature of 2.0 μm is generated at inner corners of a transfer surface of a metal mold and the case where round having a radius of curvature of 4.0 μm is generated, in a surface light source equipment, which comprises a diffuser 21 formed with inclined surfaces 28 as shown in FIG. 31. It is found from comparison between the both that while there is more or less difference in light quantity distribution, there is no influence as compared with the target distribution whereby it is possible to obtain a further stable light quantity distribution.

Embodiment 3

Figure 35:
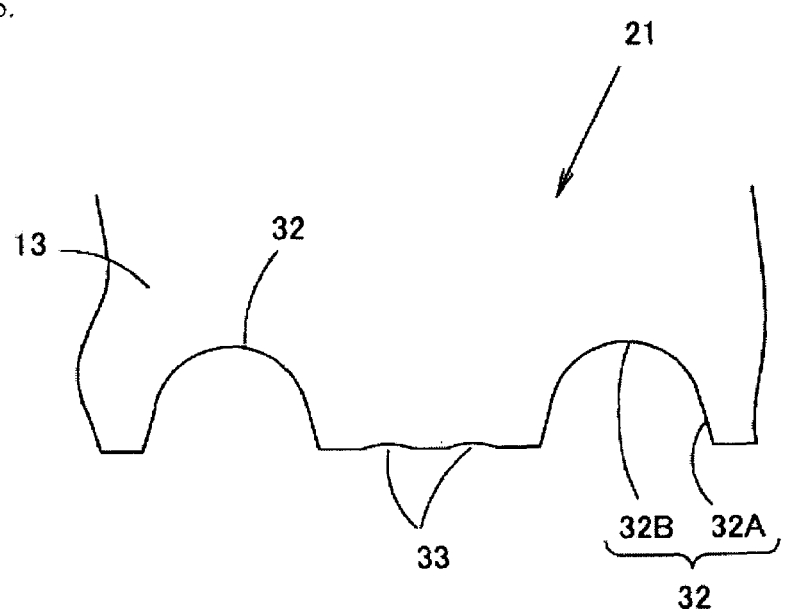
FIG. 35 is a view showing a pattern configuration of a diffuser in a surface light source equipment of Embodiment 3.

FIG. 35 is a plan view showing, in enlarged scale, a part of a diffuser 21 according to Embodiment 3 of the invention. In Embodiment 3, the diffuser 21 comprises first diffusion patterns 32 having a curved surface and second curved diffusion patterns 33.

Figure 36:
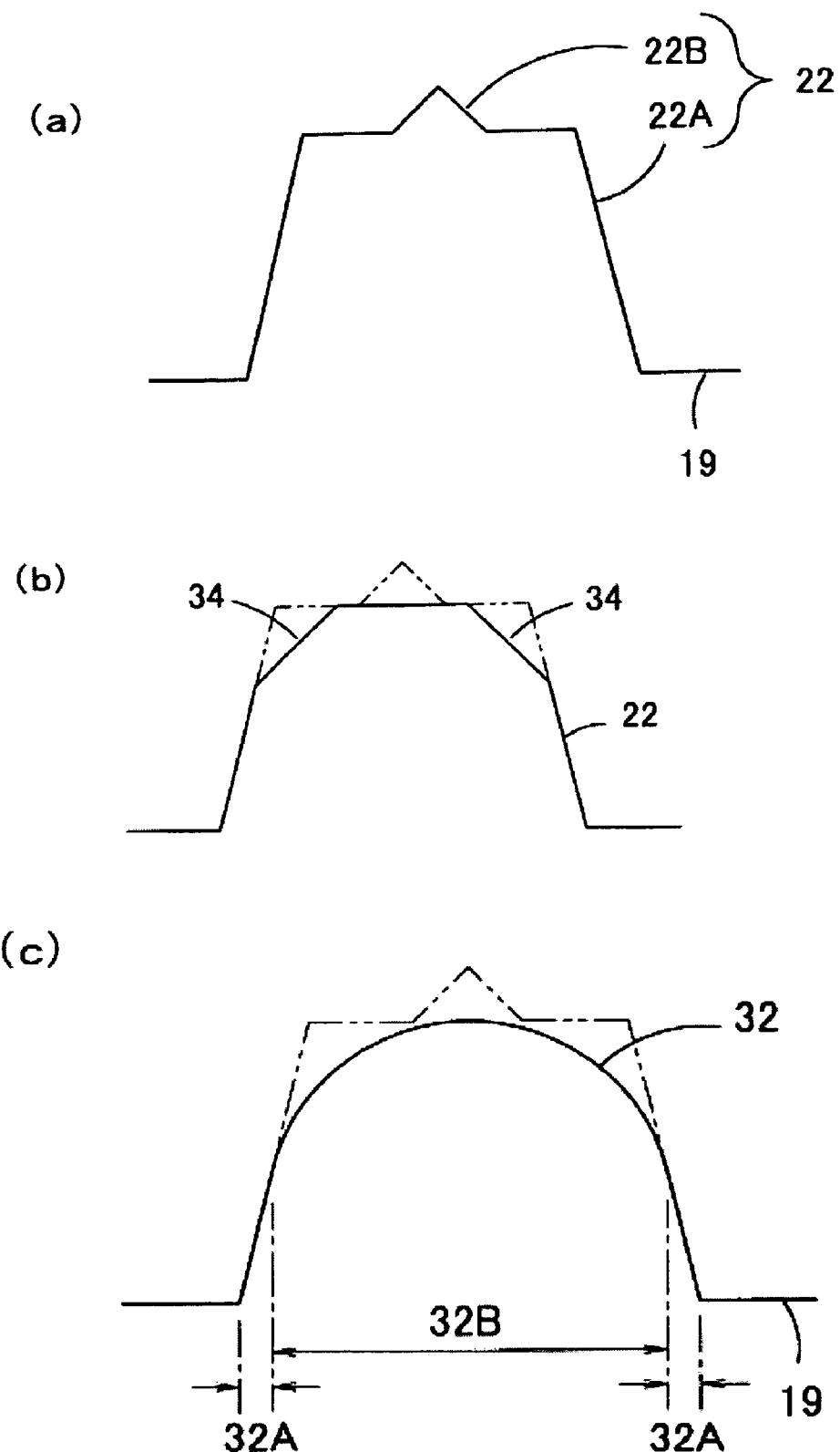
FIGS. 36(a), 36(b), and 36(c) are views illustrating a manner, in which a first diffusion pattern in Embodiment 1 is changed into a first diffusion pattern in Embodiment 3.
Figure 37:
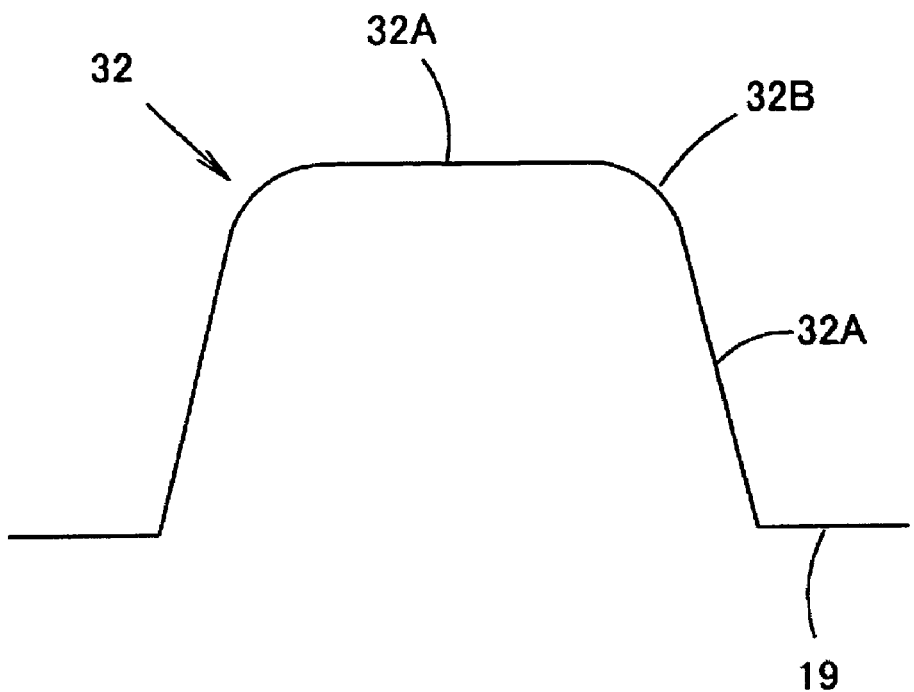
FIG. 37 is a view showing a different example of a first diffusion pattern in the surface light source equipment of Embodiment 3.

According to Embodiment 3, the first diffusion patterns 32 comprise a rectangular-shaped or trapezoidal-shaped recess having flat surface portions 32A and a curved surface 32B on a wall surface thereof. The first diffusion patterns 32 are obtained, for example, by deforming the first diffusion patterns 22, shown in FIG. 29 of Embodiment 1. That is, a first diffusion pattern 22 shown in FIG. 36(a) is shown in FIG. 29 of Embodiment 1 and comprises a trapezoidal-shaped recess 22A and a V-groove 22B. Assuming that the V-groove 22B comprises two inclined surfaces, it can be divided into two parts and provided at corner edges of the recess 22A, and corresponds to a first diffusion pattern 22 shown in FIG. 36(b). A first diffusion pattern 32 of Embodiment 3 shown in FIG. 36(c) is obtained by replacing inclined surfaces 34 of the first diffusion pattern 22 shown in FIG. 36(b) by a smooth configuration. The first diffusion patterns 32 shown in FIG. 35 and FIG. 36(C) comprise inclined flat surface portions 32A on both sides, and a curved surface portion 32B generally between the both flat surface portions 32A, but may comprise curved surface portions 32B only at corner edges thereof and flat surface portions 32A on both sides thereof and on an upper surface thereof as shown in FIG. 37. Since corner edges of the first diffusion patterns 32 are formed to be smooth in shape, the property of transfer of the first diffusion patterns 32 and the property of mold releasing from a mold die when a light conductive plate 13 is injection-molded can be made favorable and wear of the first diffusion patterns 32 caused by friction generated at the time of mold releasing can be decreased.

Figure 38:
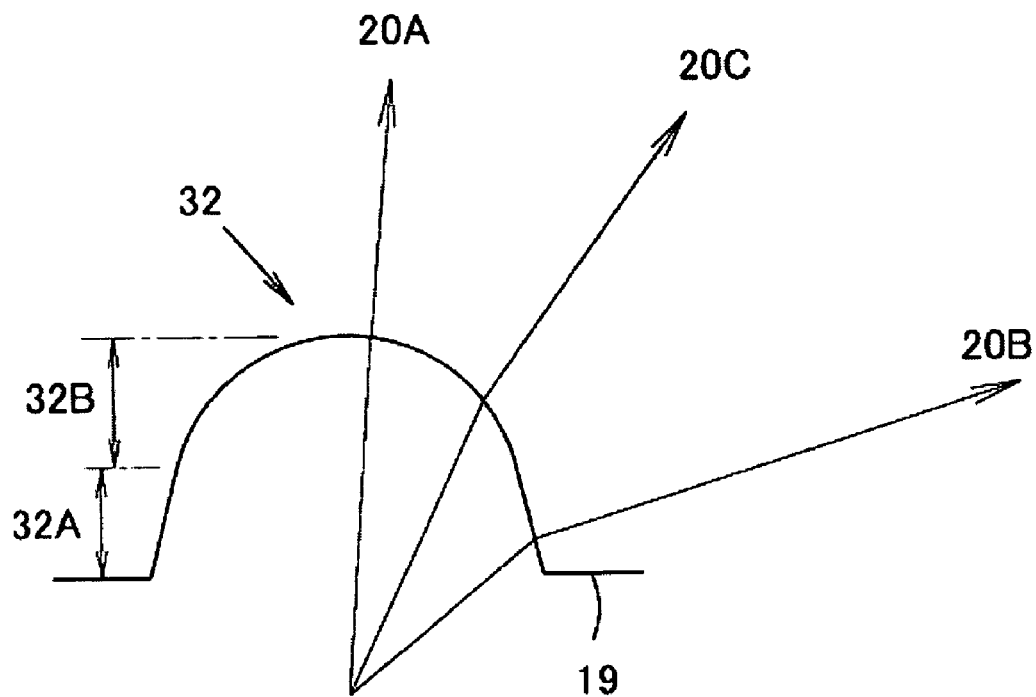
FIG. 38 is a view illustrating a manner, in which a light transmits the first diffusion pattern in the surface light source equipment of Embodiment 3.

FIG. 38 is a view illustrating an action of a first diffusion pattern 32. The first diffusion pattern 32 comprises flat surface portions 32A on both sides thereof and a curved surface portion 32B at an upper surface thereof, out of a light made incident upon the first diffusion pattern 32, a light 20A made incident centrally on the curved surface portion 32B outgoes forward, a light 20B made incident upon the flat surface portion 32A outgoes toward a corner portion, and a light 20C made incident between a central portion and an end of the curved surface portion 32B outgoes diagonally. Therefore, the first diffusion pattern 32 of Embodiment 3 also acts in the same manner as the first diffusion pattern 22 of Embodiment 1.

Also, while there is a fear in the first diffusion pattern 22 that the shape of the V-groove 22B on the upper surface thereof is deformed due to wear at the time of molding, such V-groove 22B is absent in Embodiment 3, so that it is unnecessary to care for deformation of the V-groove 22B and the light conductive plate 13 becomes favorable in moldability.

In addition, a dimensional ratio of the flat surface portion 32A and the curved surface portion 32B is adjusted and determined together with a configuration and a period of the first diffusion pattern 32 so that the light quantity distribution approaches the target distribution.

Figure 39:
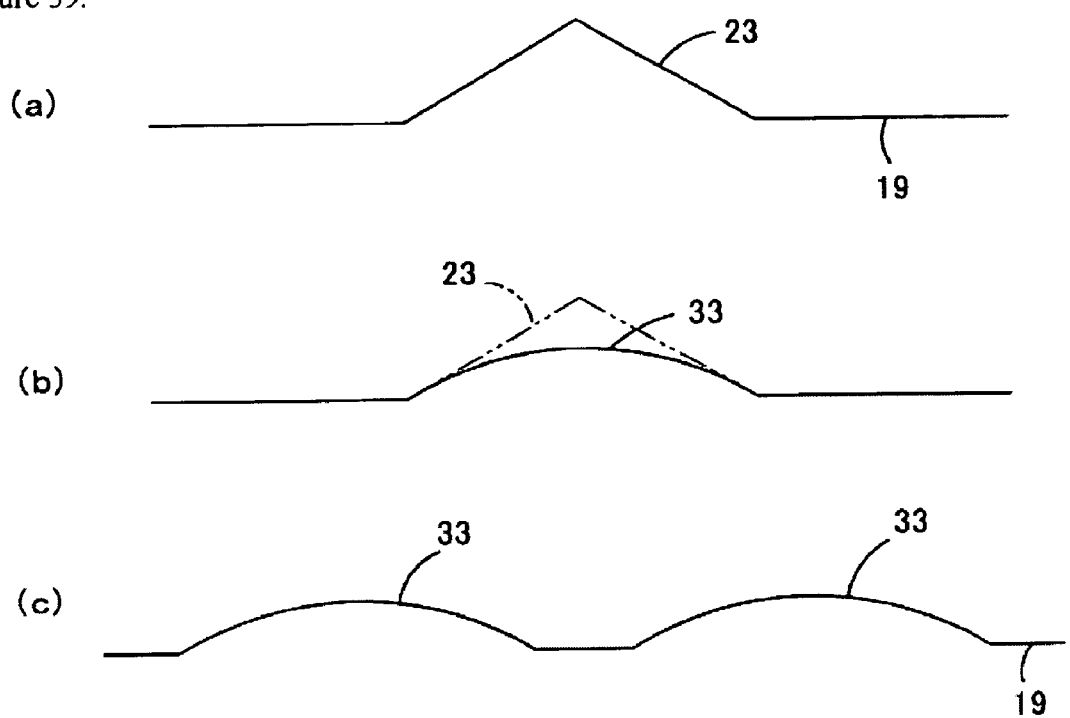
FIGS. 39(a), 39(b), and 39(c) are views illustrating a manner, in which a second diffusion pattern in Embodiment 1 is changed into a second diffusion pattern in Embodiment 3.

Also, according to Embodiment 3, the second diffusion patterns 33 comprise shallow recesses formed by a smooth curve, and are provided in plural (for example, two) between the first diffusion patterns 32 in the example as shown. The second diffusion patterns 33 of Embodiment 3 are obtained by deforming the V-grooved second diffusion patterns 23 illustrated in Embodiment 1 and Embodiment 2. That is, a V-grooved second diffusion pattern 23 shown in FIG. 39(a) is illustrated in Embodiment 1 and Embodiment 2. A second diffusion pattern 33 of Embodiment 3 shown in FIG. 39(b) is obtained by replacing the second diffusion pattern 23 shown in FIG. 39(a) by a smooth configuration. The second diffusion pattern 33 is formed by a smooth configuration without corners of the diffusion pattern whereby the property of transfer of the second diffusion patterns 33 and the property of mold releasing from a mold die when a light conductive plate 13 is injection-molded can be made favorable and wear of the second diffusion patterns 33 caused by friction generated at the time of mold releasing can be decreased. Further, since the second diffusion patterns 33 are made shallow, the second diffusion patterns 33 are provided in plural as shown in FIG. 39(c) in order to compensate for a quantity of a light, which is distributed obliquely of the light conductive plate 13 by the second diffusion patterns 33.

Figure 40:
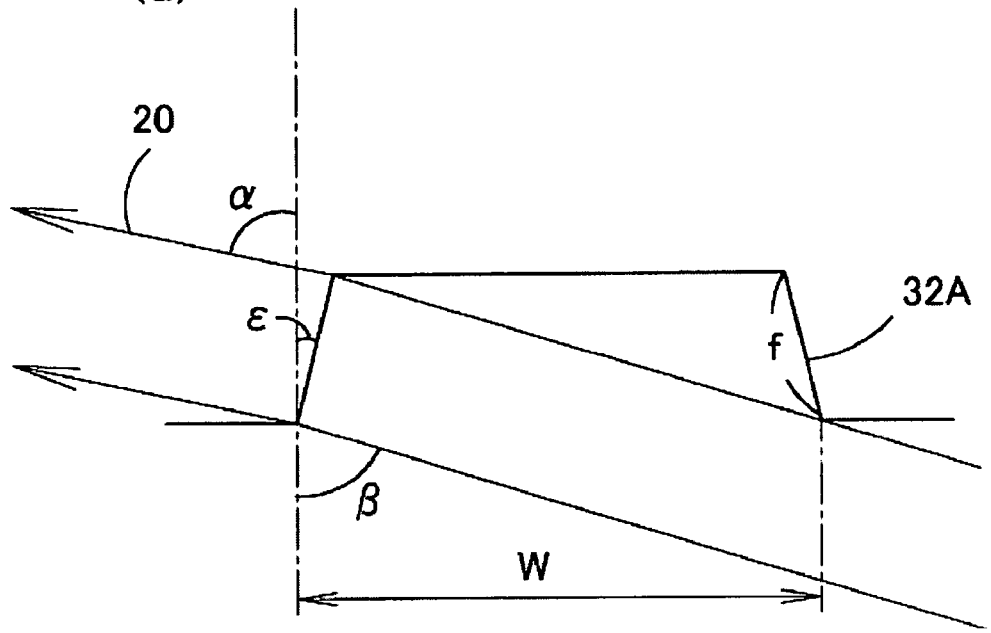
FIGS. 40(a) and 40(b) are views illustrating a method of designing the first diffusion pattern in Embodiment 3.
Figure 40:
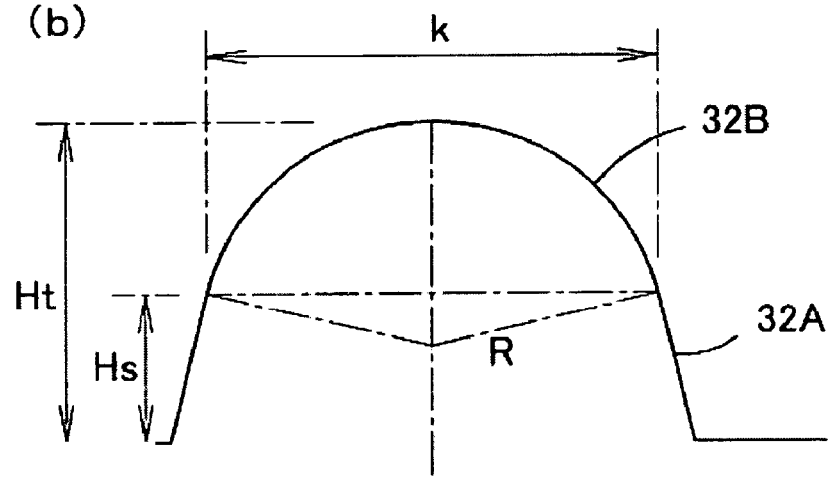

Subsequently, an explanation will be given to a method of designing the first diffusion patterns 32. First, let consider a trapezoid defined only by flat surface portions 32A as shown in FIG. 40(a) and assume that the flat surface portions 32A has sides having a length f=5 μm, and an inclination ε of 5° in view of moldability, and a light conductive plate 13 has a refractive index of n=1.53. Here, in order to cause a light 20 to outgo in a direction of α=82.4° (an outgoing angle from the flat surface portions 32A is 7.60°) in the same manner as the case of Embodiment 1, it is necessary to make the light 20 incident upon the flat surface portions 32A in a direction of β=81.0° (an incident angle to 32A is 3.96°). Therefore, when design is made so that the light 20 made incident passing through a lower end of the flat surface portions 32A and in the direction of β=81.0° outgoes from an upper end of the flat surface portions 32A, the first diffusion pattern 32 has a width W=32.1 μm.

Subsequently, let consider the case where an arcuate-shaped curved surface portion 32B is stacked on the trapezoid determined in the above manner as shown in FIG. 40(b). Since an upper surface of the trapezoid has a width k $$k=W-2\times f\times \sin \epsilon = 31.2 \text{ (μm)}$$

a radius R of the curved surface portion 32B is determined to be $$R=15.7 \text{ μm}$$

based on $$2R \cos \epsilon = k$$

In addition, a center of an arc of the curved surface portion 32B is positioned to be as lower as R sin ε=1.36 μm than the upper surface of the trapezoid.

Consequently, a height Hs of the flat surface portions 32A and a height Ht of the first diffusion pattern 32, respectively, are given by $$Hs=f\times\cos \epsilon = 4.98 \text{ (μm)}$$

$$Ht=Hs+R-R \sin \epsilon = 19.25 \text{ (μm)}$$

Figure 41:
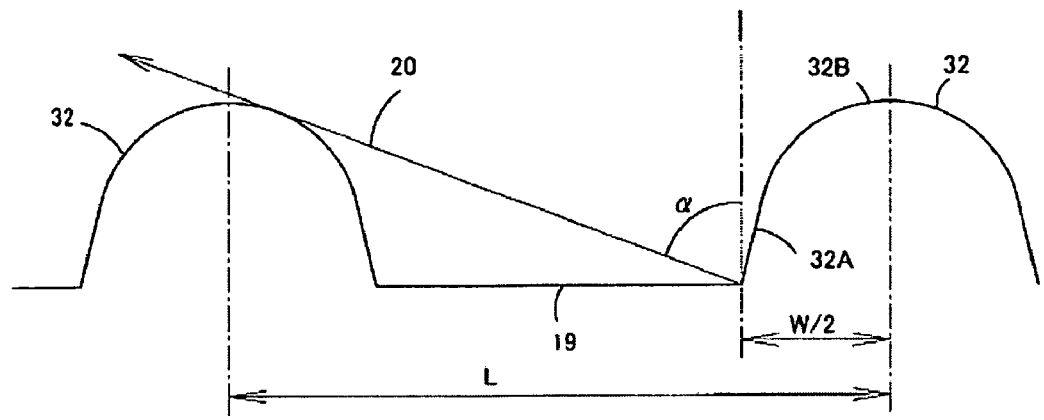
FIG. 41 is a view illustrating a method of determining a period of the first diffusion patterns in Embodiment 3.

Subsequently, in order to prevent a light 20, which outgoes from a lower end of the first diffusion pattern 32 in a direction of α=82.4° as shown in FIG. 41, from being interrupted by adjacent first diffusion pattern 32, it suffices that a period L of the first diffusion patterns 32 is equal to or more than 162 μm as found from the geometrical relationship in FIG. 41.

Figure 42:
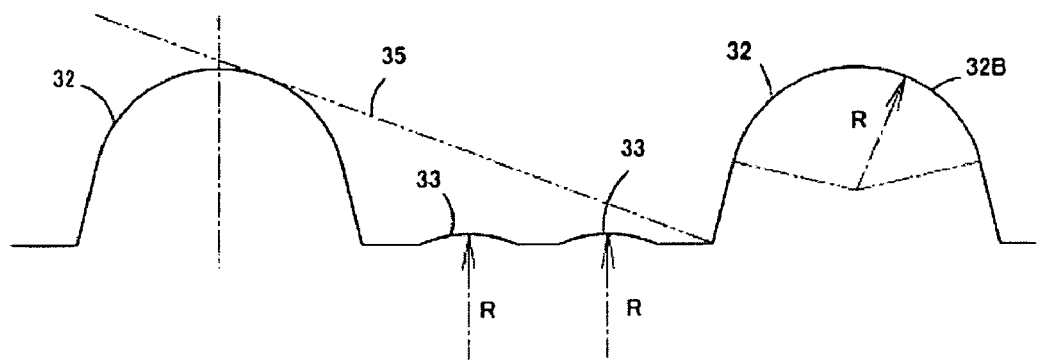
FIG. 42 is a view illustrating a method of designing the second diffusion patterns in Embodiment 3.

FIG. 42 illustrates conditions in forming the second diffusion patterns 33. That is, considering a tangent line of the first diffusion pattern 32 passing through a lower end of an adjacent first diffusion pattern 32, the second diffusion patterns 33 are made such that the second diffusion patterns 33 disposed between the first diffusion patterns 32 in discussion do not get over the tangent line 35. This means that a light outgoing from the first diffusion pattern 32 in the direction of α is not interrupted by the second diffusion patterns 33.

Also, the second diffusion patterns 33 desirably have an arc of the same radius of curvature as that of the curved surface portion 32B of the first diffusion pattern 32. By making the radius of curvature of the curved surface portion 32B of the first diffusion pattern 32 equal to that of the second diffusion patterns 33, it is possible to use a single cutting tool to manufacture that portion of a mold die, which molds portion to be molded of the curved surface portion 32B, and the second diffusion pattern 33. Thereby, since the curved surface portion 32B and the second diffusion pattern 33 can be continuously cut without exchange of a cutting tool, the diffuser 21 is improved in dimensional accuracy and a mold die is reduced in manufacturing cost. Accordingly, in Embodiment 3, both the curved surface portion 32B of the first diffusion pattern 32 and the second diffusion pattern 33 are formed with an arcuate surface, which has a radius of curvature of R=15.7 μm.

The second diffusion patterns 33 defined by a curved surface make it possible to cause an incident light to outgo in an inclined direction such as a diagonal direction to the surface light emission region 15 in the same manner as the second diffusion pattern 23 of Embodiment 1.

Figure 43:
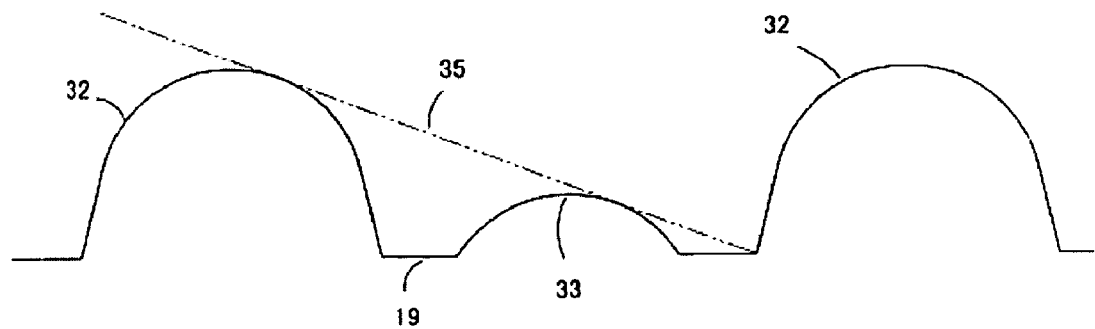
FIG. 43 is a view showing a different example of the second diffusion patterns in Embodiment 3.

Only one of the second diffusion patterns 33 may be provided between the adjacent first diffusion patterns 32 as shown in FIG. 43. In the case where the second diffusion pattern 33 is provided singly to lead to insufficiency of a light outgoing in an inclined direction, however, a plurality of second diffusion patterns 33 may be provided between the first diffusion patterns 32 as in the illustrated example. On the other hand, since the flat portion (light incident surface 19) is reduced in area when a plurality of second diffusion patterns 33 are provided between the first diffusion patterns 32, it seems that a quantity of a light outgoing forward is decreased by the second diffusion patterns 33, but a decrease in light intensity is not so much caused in the front since the first diffusion patterns 32 and the second diffusion patterns 33 cause a light to outgo in a direction of θ=0° as shown in FIG. 44.

Figure 44:
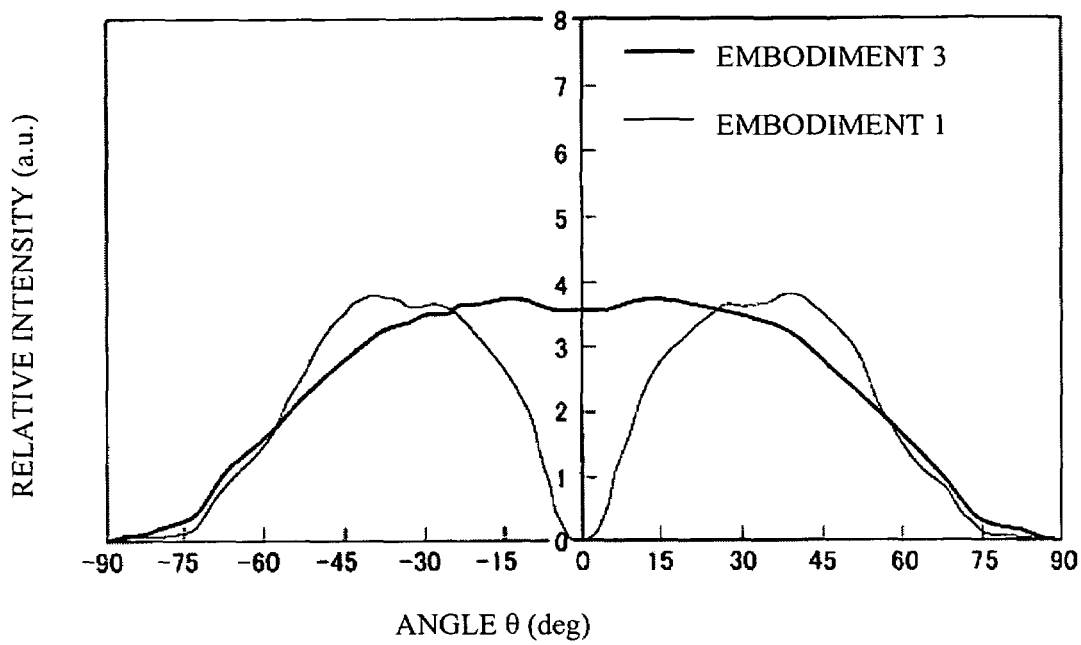
FIG. 44 is a graph representing a comparison between a light quantity distribution of the first diffusion patterns in Embodiment 3 and a light quantity distribution of the first diffusion patterns in Embodiment 1.
Figure 45:
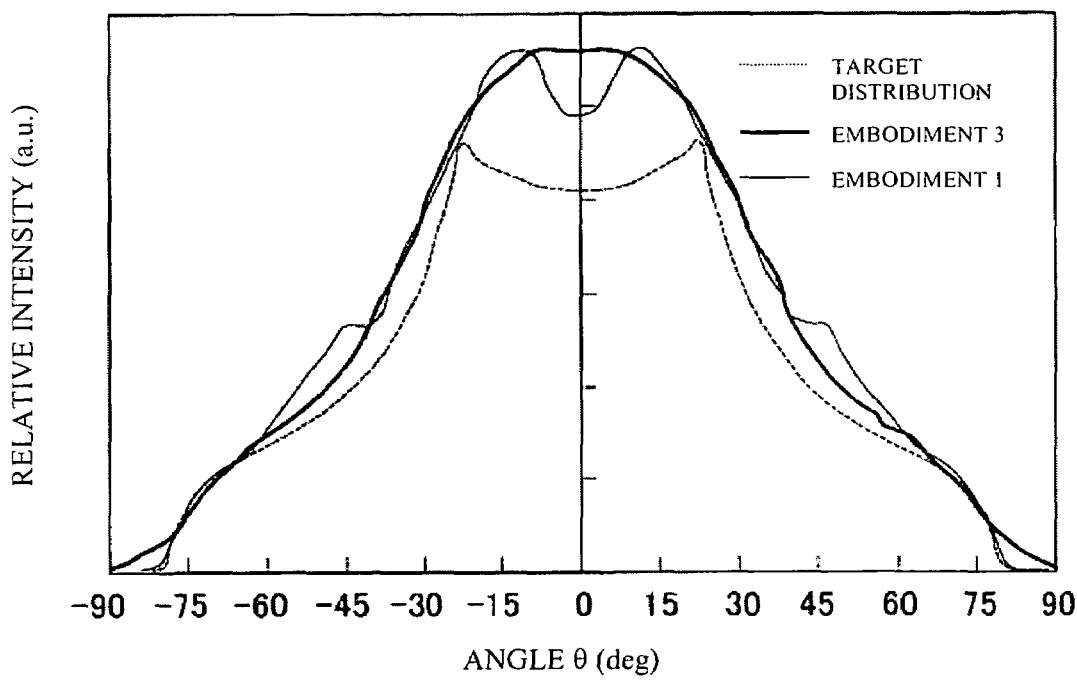
FIG. 45 is a graph representing a comparison between a light quantity distribution of a diffuser in Embodiment 3, a light quantity distribution of a diffuser in Embodiment 1, and a target distribution.

FIG. 44 is a graph representing a comparison between the light quantity distribution of a light outgoing from the curved surface portion 32B of Embodiment 3 and the light quantity distribution of a light outgoing from the V-groove 22B of Embodiment 1. The reference numeral 22B denotes an optical element, in which a light is conducted in an oblique direction (about θ=45°), and when the optical element is curved and replaced by the curved surface portion 32B, a light conducted in an oblique direction is not so much varied in quantity although the light quantity distribution is more or less varied in profile.

Accordingly, when a comparison is made between the light quantity distribution provided by the diffuser 21 of Embodiment 3 and the light quantity distribution provided by the diffuser 21 of Embodiment 1, a quantity of a light conducted to corner portions is somewhat decreased in Embodiment 3 as compared with the case in Embodiment 1 but there is no large characteristic difference between Embodiment 3 and Embodiment 1, and a characteristic close to the target distribution is obtained in the both.

Therefore, according to Embodiment 3, it is possible to make moldability favorable and achieve a decrease in wear of the patterns at the time of molding while maintaining the optical characteristic substantially equivalent to that in Embodiment 1 with the V-groove 22B used.

Figure 46:
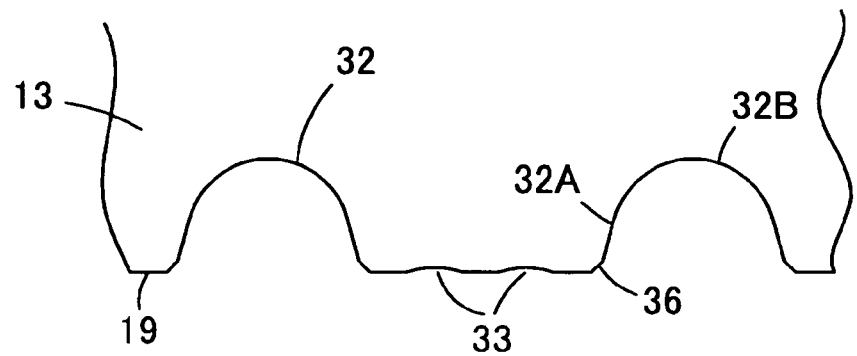
FIG. 46 is a view showing a pattern configuration of a diffuser in a modification of Embodiment 3.

FIG. 46 is a plan view showing, in enlarged scale, a part of a diffuser 21 according to a modification of Embodiment 3. In the modification, rounded portion or tapered portions 36 are formed on lower ends of the first diffusion patterns 32 of the diffuser 21 shown in FIG. 35 to make the lower ends of the first diffusion patterns 32 smooth. Thereby, it is possible to make the property of transfer and the property of mold releasing at the time of molding further favorable to further decrease wear of the diffusion patterns caused by friction generated at the time of mold releasing.

(Liquid-crystal Display)

Figure 47:
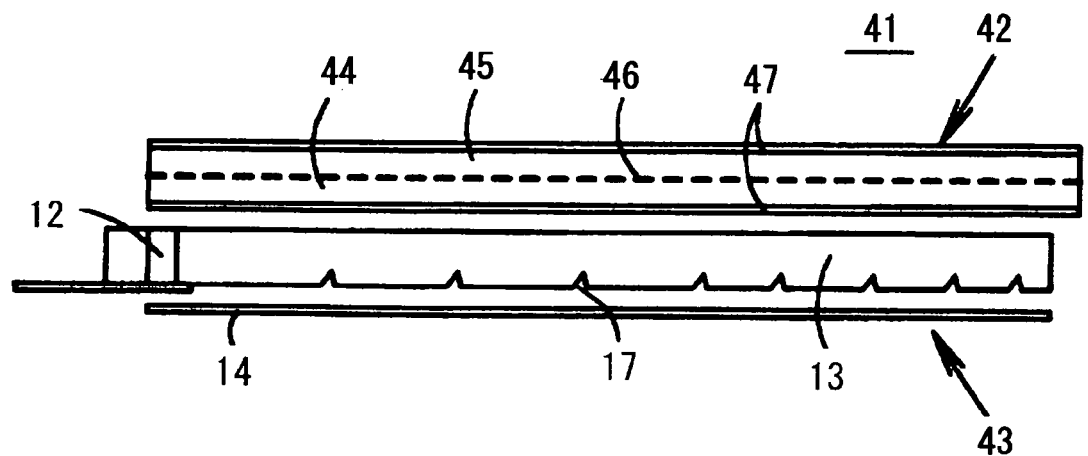
FIG. 47 is a schematic, cross sectional view showing a liquid-crystal display, in which a surface light source equipment according to the invention is used.

FIG. 47 is a schematic cross sectional view showing a liquid-crystal display 41 according to the invention. The liquid-crystal display 41 comprises a surface light source equipment 43 of the invention arranged on a back surface of a liquid-crystal display panel 42. The liquid-crystal display panel 42 comprises a liquid-crystal layer 46 interposed and sealed between a back surface side substrate 44, on which switching elements, such as TFT (thin film transistor) and wiring are formed, and a front surface side substrate 45, on which a transparent electrode and a color filter are formed, and polarizing plates 47 overlapped on both front and back surfaces. With the liquid-crystal display 41, the surface light source equipment 43 is lighted to irradiate the liquid-crystal display panel 42 from a back surface side to ON and OFF control respective pixels of the liquid-crystal display panel 42, thus generating an image.

In addition, since the surface light source equipment according to the invention can be applied to a front light, it can also be used for a reflection type liquid-crystal display although not shown.

(Portable Telephone)

Figure 48:
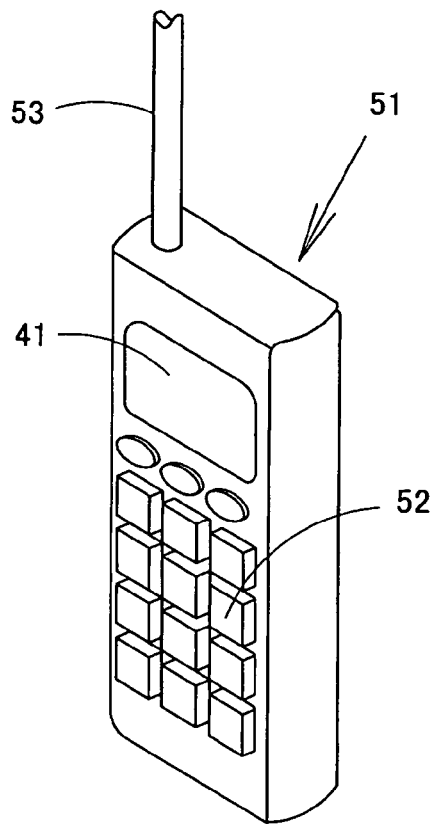
FIG. 48 is a perspective view showing a portable telephone comprising a liquid-crystal display according to the invention.

FIG. 48 shows a portable telephone 51, into which the liquid-crystal display 41 according to the invention is assembled. With the portable telephone 51, the liquid-crystal display 41 is assembled as a display onto a dial part 52 provided with ten keys, etc., and an antenna 53 is provided on an upper surface thereof.

(Portable Information Terminal)

Figure 49:
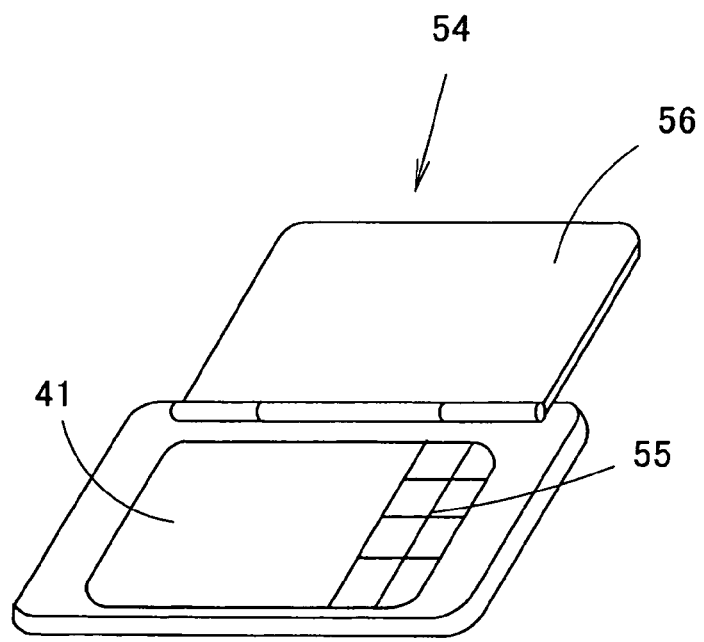
FIG. 49 is a perspective view showing a portable information terminal comprising a liquid-crystal display according to the invention.

FIG. 49 shows a portable information terminal 54, such as PDA, into which the liquid-crystal display 41 according to the invention is assembled as a display. The portable information terminal 54 comprises an input unit 55 for pen input, etc., provided laterally of the liquid-crystal display 41, and a lid 56 pivotally mounted to an upper end thereof.

By using the liquid-crystal display 41 of the invention for the portable telephone 51, the portable information terminal 54, etc. in this manner, the surface light source equipment is caused to emit light uniformly, thus enabling an improvement in image quality.

INDUSTRIAL APPLICABILITY

The surface light source equipment according to the invention is usable as a back light and a front light for liquid-crystal display panels, etc., or illuminating lamp, etc.

DRAWINGS

Figure 3:
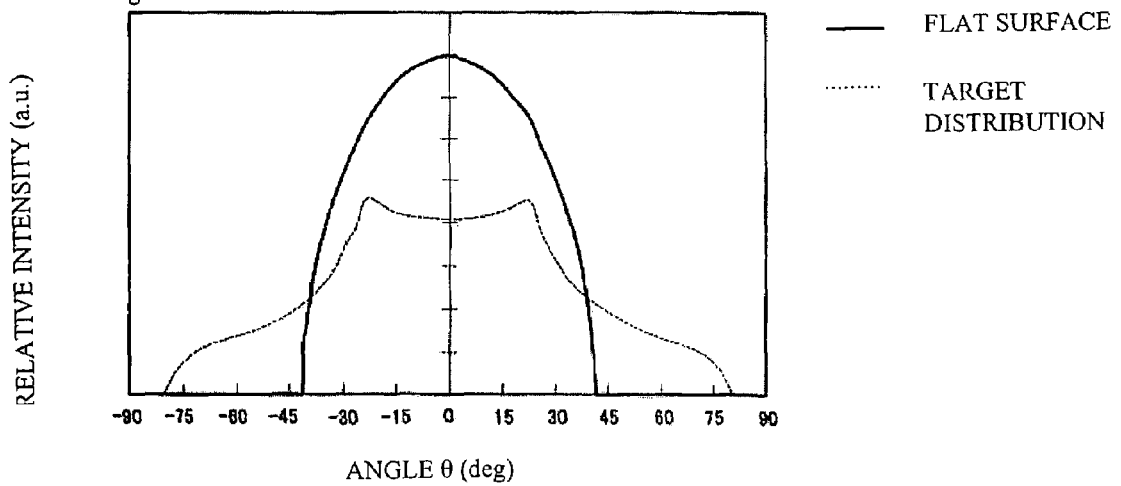
FIG. 3 is a view showing a light quantity distribution in the surface light source equipment of the conventional example 1.
Figure 4:
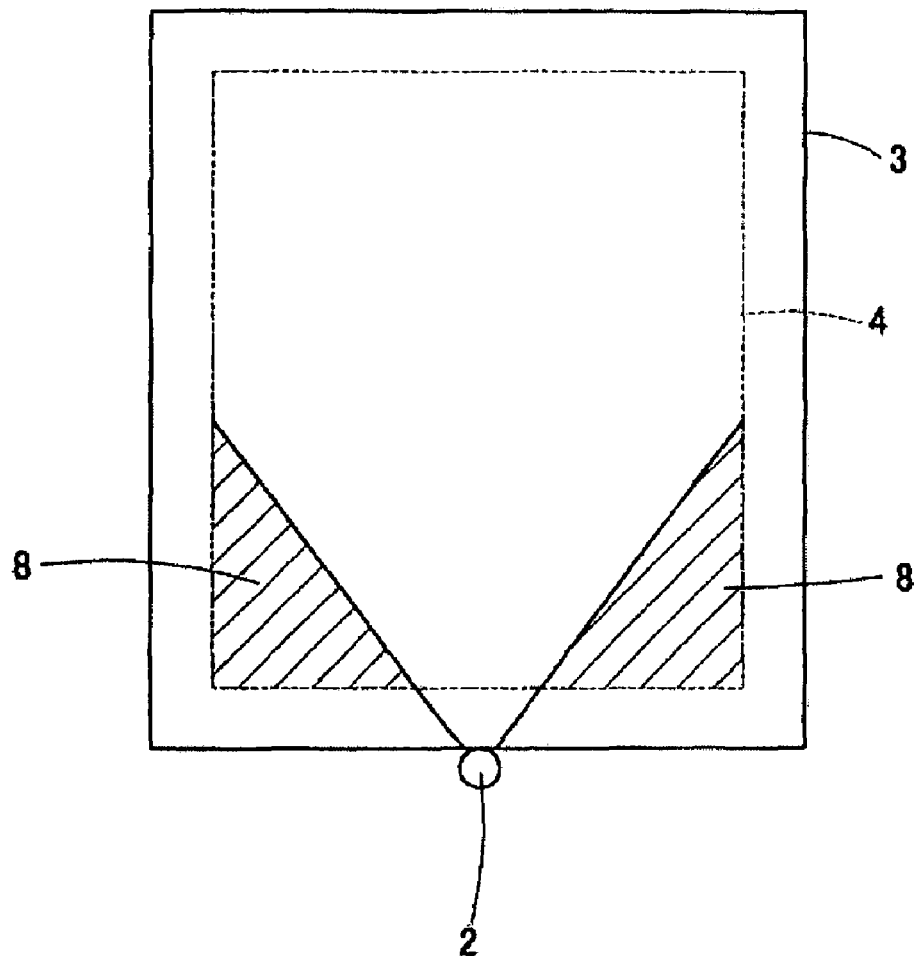
FIG. 4 is a view showing dark parts in a light outgoing surface, generated in the surface light source equipment of the conventional example 1.
Figure 5:
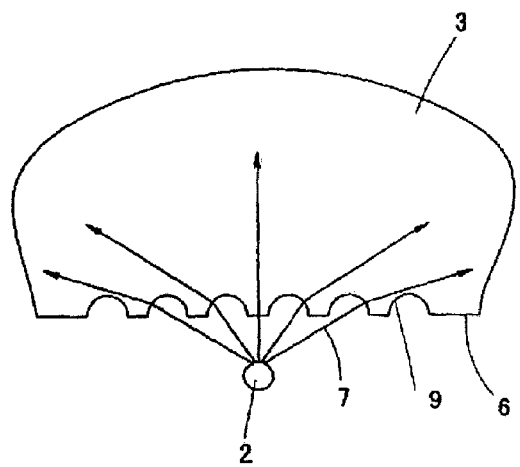
FIG. 5 is a plan view showing semi-circular recesses provided on a light incident surface in a surface light source equipment of a conventional example 2.

[FIG. 3]
Relative Intensity
Angle
Flat Surface
Target Distribution

Figure 6:
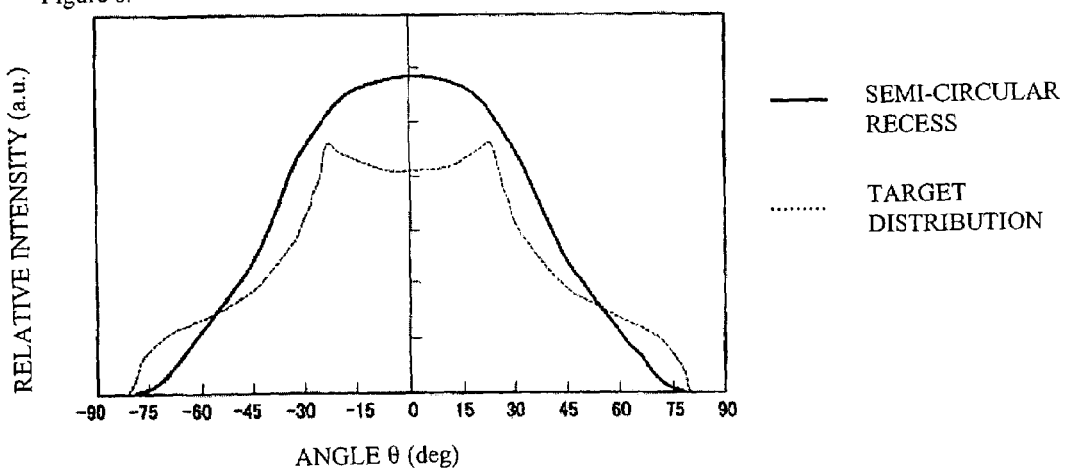
FIG. 6 is a view showing a light quantity distribution in the surface light source equipment of the conventional example 2.
Figure 7:
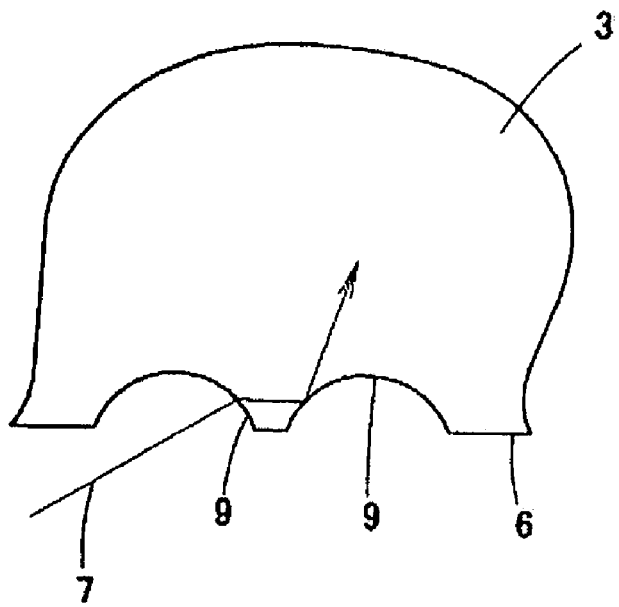
FIG. 7 is a view illustrating a manner, in which a light diffusing laterally of a semi-circular recess is interrupted by an adjacent semi-circular recess in the case where the semi-circular recesses are made large.
Figure 8:
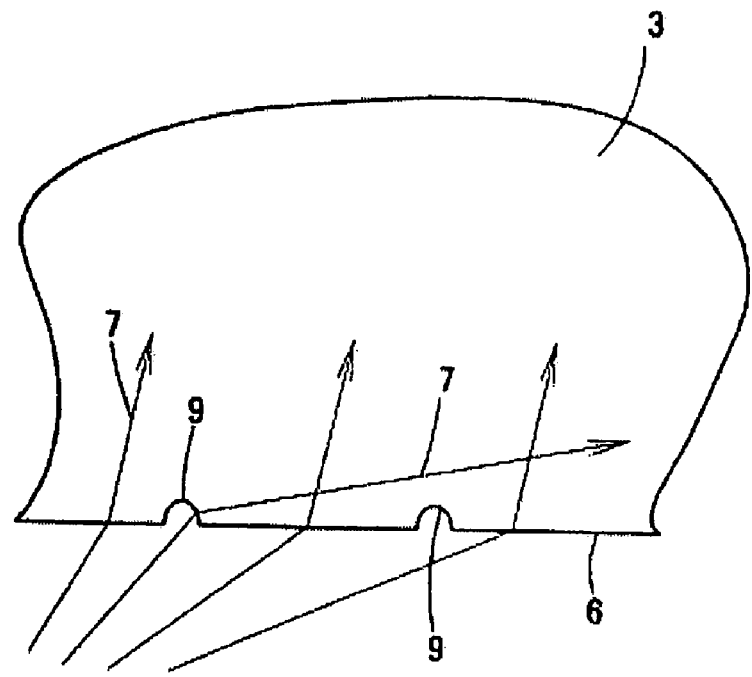
FIG. 8 is a view illustrating a manner, in which a light becomes weak in diffusion not to be adequately spread toward corners of a surface light emission region in the case where the semi-circular recesses are made small.
Figure 9:
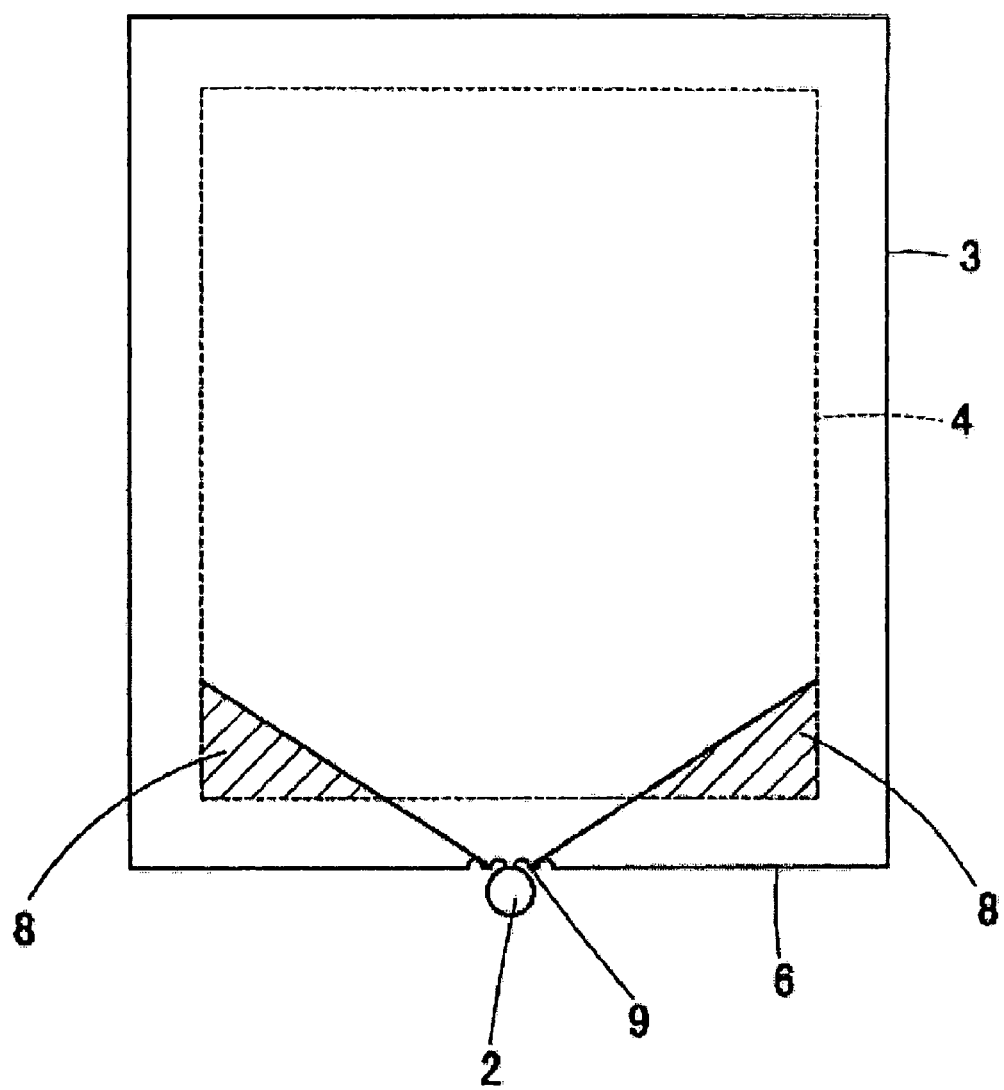
FIG. 9 is a view showing dark parts in a light outgoing surface, generated in the surface light source equipment of the conventional example 2.
Figure 10:
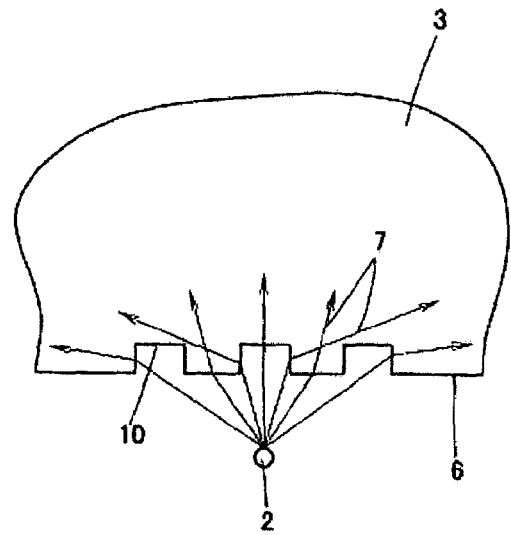
FIG. 10 is a plan view showing rectangular-shaped recesses provided on a light incident surface in a surface light source equipment of a conventional example 3.

[FIG. 6]
Relative Intensity
Semi-Circular Recess
Target Distribution

Figure 11:
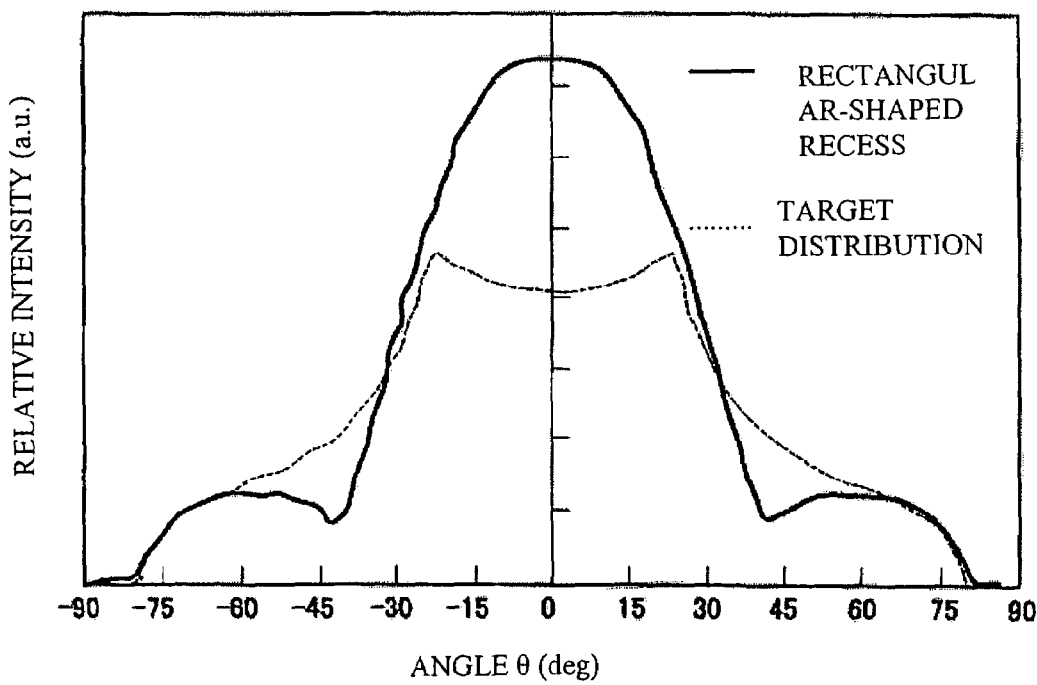
FIG. 11 is a view showing a light quantity distribution in the surface light source equipment of the conventional example 3.
Figure 12:
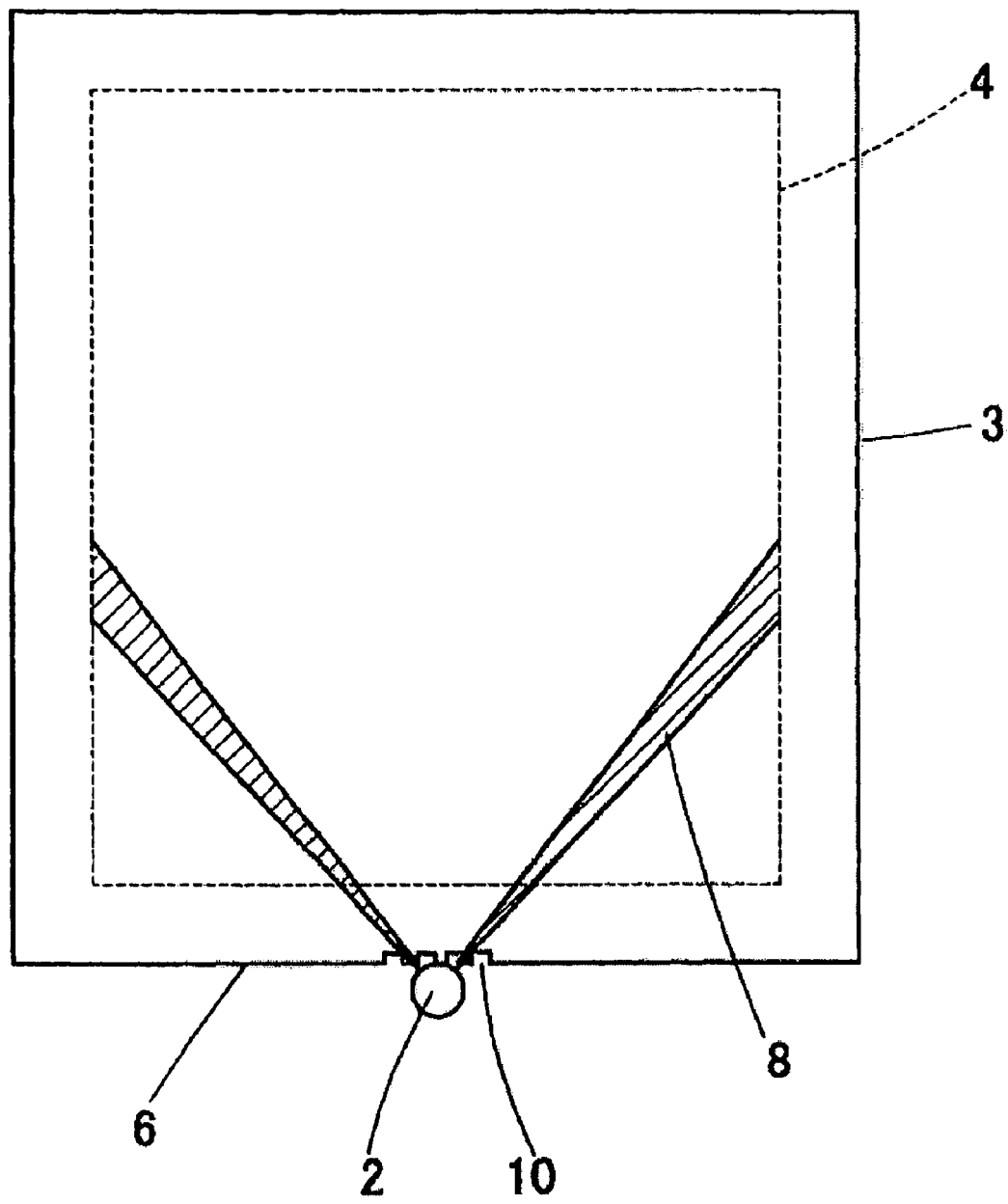
FIG. 12 is a view showing dark parts in a light outgoing surface, generated in the surface light source equipment of the conventional example 3.

[FIG. 11]
Relative Intensity
Angle
Rectangular-Shaped Recess
Target Distribution

[FIG. 21]
Relative Intensity
Angle
Horizontal Side
Vertical Side
Oblique Side

[FIG. 22]
Relative Intensity
Angle
Embodiment
Target Distribution

[FIG. 44]
Relative Intensity
Angle
Embodiment

[FIG. 22]
Relative Intensity
Angle
Target Distribution
Embodiment

What is claimed is:

1. A surface light source equipment comprising:
    a light conductive plate, by which a light introduced from a light incident surface is spread on a substantially whole light outgoing surface to outgo outside from the light outgoing surface, and
    a light source arranged opposite the light incident surface of the light conductive plate and being small as compared with a width of the light conductive plate, wherein
        a plurality of recesses are arranged as first diffusion patterns in a region on the light incident surface,
        the first diffusion patterns face the light source,
        each of the first diffusion patterns comprises:
            a first surface configured to refract light in a first direction substantially in a direction of a normal line to the light incident surface,
            a second surface configured to refract light in a second direction directed toward a corner close to the light incident surface of the light conductive plate, and
            a third surface configured to refract light in a third direction between the first direction and the second direction,
        a pitch between the first diffusion patterns is smaller than a width of the light source, and
        the light conductive plate further comprises a second diffusion pattern, in the form of a V-groove, a V-shaped projection, or an arc, formed on the light incident surface between the first diffusion patterns.

2. The surface light source equipment according to claim 1, wherein the first diffusion patterns comprise a rectangular-shaped or trapezoidal-shaped recess, and a concave groove or a projection provided centrally on a first recess surface parallel to the light incident surface.

3. The surface light source equipment according to claim 2, wherein the recesses are provided periodically on the light conductive plate and a width of the concave groove or the projection is equal to or less than ⅓ of the period of the recesses.

4. The surface light source equipment according to claim 3, wherein a corner between the light incident surface of the light conductive plate and a surface of the first diffusion pattern in contact with the light incident surface is chamfered or rounded.

5. The surface light source equipment according to claim 2, wherein the concave groove or the projection is a V-grooved groove or a V-shaped projection.

6. The surface light source equipment according to claim 5, wherein a corner between the light incident surface of the light conductive plate and a surface of the first diffusion pattern in contact with the light incident surface is chamfered or rounded.

7. The surface light source equipment according to claim 2, further comprising a second diffusion pattern, in the form of a V-groove, a V-shaped projection, or an arc, formed on the light incident surface to be intermediate between the first diffusion patterns.

8. The surface light source equipment according to claim 2, wherein a corner between the light incident surface of the light conductive plate and a surface of the first diffusion pattern in contact with the light incident surface is chamfered or rounded.

9. The surface light source equipment according to claim 1, wherein the first diffusion patterns comprise a rectangular-shaped or trapezoidal-shaped recess, and a corner of the recess on an opposite side to a light incident side is formed to be arcuate.

10. The surface light source equipment according to claim 9, wherein a corner between the light incident surface of the light conductive plate and a surface of the first diffusion pattern in contact with the light incident surface is chamfered or rounded.

11. The surface light source equipment according to claim 1, wherein the first diffusion patterns comprise a rectangular-shaped or trapezoidal-shaped recess, and a far end surface of the recess on an opposite side to a light incident side is formed to be arcuate.

12. The surface light source equipment according to claim 11, wherein a corner between the light incident surface of the light conductive plate and a surface of the first diffusion pattern in contact with the light incident surface is chamfered or rounded.

13. The surface light source equipment according to claim 1, wherein supposing a virtual line segment in parallel to a line segment passing through an end of the first diffusion pattern in contact with the light incident surface and passing through the light source and an end of a surface light emission region of the light conductive plate, the first diffusion patterns and the second diffusion pattern do not get over the virtual line segment.

14. The surface light source equipment according to claim 1, wherein a corner between the light incident surface of the light conductive plate and a surface of the first diffusion pattern in contact with the light incident surface is chamfered or rounded.

15. The surface light source equipment according to claim 1, wherein the surface light source is disposed in an image display comprising an image display panel.

16. The surface light source equipment according to claim 15, wherein the image display is disposed in portable equipment.

* * * * *